United States Patent [19]

Quay et al.

[11] 3,899,768

[45] Aug. 12, 1975

[54] METHOD OF SEISMIC SURVEYING BY EXTRACTING AND DISPLAYING SEISMIC PROPERTIES

[75] Inventors: Roy Gibson Quay; Clifford Harvey Ray, both of San Antonio, Tex.

[73] Assignee: Petty-Ray Geophysical, Inc., Houston, Tex.

[22] Filed: July 11, 1973

[21] Appl. No.: 378,176

Related U.S. Application Data

[63] Continuation of Ser. No. 347,197, April 2, 1973, abandoned.

[52] U.S. Cl... 340/15.5 DS; 343/33 C; 340/15.5 SS; 340/15.5 DP
[51] Int. Cl. .............................................. G01v 1/24
[58] Field of Search ................. 340/15.5 DS, 15.5 SS, 340/15.5 DP; 343/33 C; 441/1

[56] References Cited

UNITED STATES PATENTS

| | | | |
|---|---|---|---|
| 3,173,743 | 3/1965 | Weissensteiner | 340/15.5 DS |
| 3,668,618 | 6/1972 | Quay | 340/15.5 DP |
| 3,681,748 | 8/1972 | Diltz | 340/15.5 DS |

OTHER PUBLICATIONS

Smith et al., "Computer Graphics in Geophysics," 10/72, pp. 825-838, Geophysics, Vol. 37, No. 5, G-222.

*Primary Examiner*—Maynard R. Wilbur
*Assistant Examiner*—N. Moskowitz
*Attorney, Agent, or Firm*—Arnold, White & Durkee

[57] ABSTRACT

New insight is gained into geological interpretation of seismograph record sections by use of a new technique for extracting and displaying the lateral variations of seismic properties, such as the peak frequency and energy weighted average frequency of seismic waves, occurring at or between time varying seismic boundaries, associated with the geologic contacts of rock strata, as pre-outlined upon such a record section.

In one form, lateral variations in the seismic property, associated with specified intervals or zones of seismic data, are displayed as a pair of envelopes plotted about a reference axis which is the mean time between the upper and lower boundaries of the specified interval or zone of data from which the property was extracted. An upper envelope displays the local magnitude of the seismic property, associated with the zone; and a lower envelope displays the local ratio of this magnitude to the magnitude of the same property observed at an underlying interval or zone of data. Thus, the upper envelope shows the lateral variance of the seismic property whereas the lower envelope provides a means of estimating whether anomalies in the upper envelope are being caused by changes in the common zone overlying both intervals.

Separate transparent overlay sheets for each extracted property can be used for the plotting of the reference axes and their envelopes. These overlays can be superimposed upon each other or upon the corresponding seismic record section to the same scale. The visual correlation of anomalous variations in local seismic properties relative to the structural interpretation based upon the seismic record section yields new dimensions in the possibilities of interpreting geologic conditions favorable for the accumulation of petroleum.

47 Claims, 5 Drawing Figures

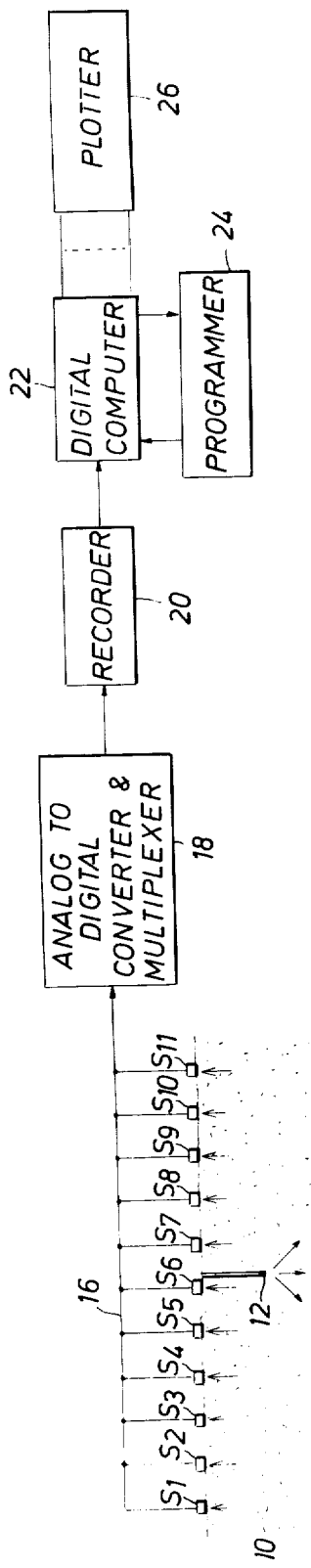
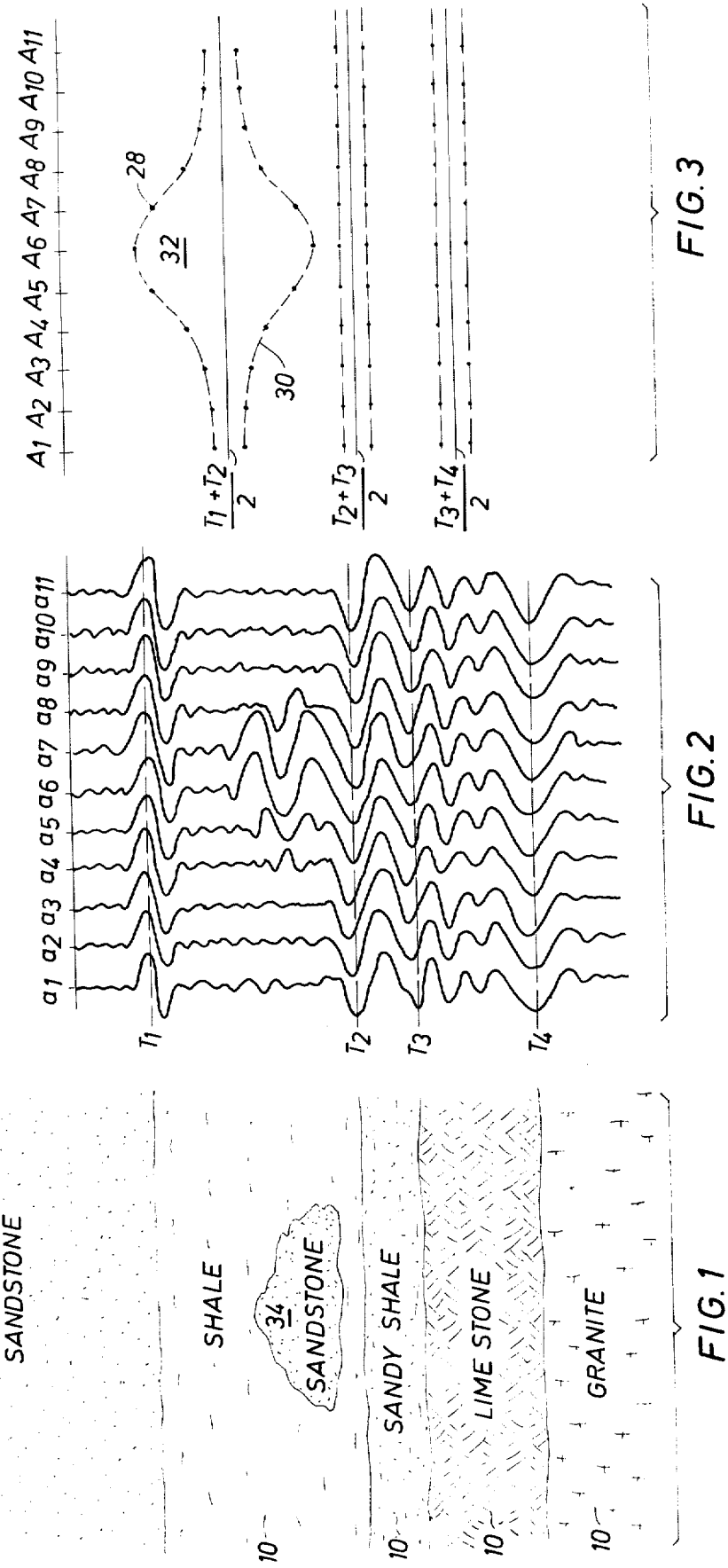

METHOD OF SEISMIC SURVEYING BY EXTRACTING AND DISPLAYING SEISMIC PROPERTIES

CROSS REFERENCE TO RELATED APPLICATION

This is a continuation of copending application Ser. No. 347,197, filed Apr. 2, 1973, now abandoned.

BACKGROUND OF THE INVENTION

In seismic surveying of the earth by the reflection method, it has been standard practice to initiate a seismic disturbance at or near the surface of the earth (or at sea, at or near the surface of the water), and to detect and record the amplitude of the returning, reflected seismic waves by means of arrays of seismometers, and recording apparatus well known in the art.

In the past, the amplitude information in the reflected seismic waves has been used primarily to define and delineate major subterranean discontinuities between different rock layers. That is, when the amplitude of a seismic wave was found to be somewhat greater than that of the background signal, it was assumed that such an anomalous amplitude is evidence of the reflection of seismic waves from such a discontinuity. Persistence in such increased amplitude among successive positions along a line of survey is taken as confirmation of the existence of a discontinuity, comprising an extensive surface between two different rock formations.

In the prior art, little attempt was made to determine the nature of the rocks involved by any seismological means. Most of the displays and the analysis of the seismograph data were based solely on the rock strata configuration determined from a knowledge of the location and orientation of the discontinuities. One attempt to locate changes in a subsurface stratum was described by Grossling in Canadian Pat. No. 646,179 issued Aug. 7, 1962. The presentation was described as a contour map of the ratio of the amplitudes of two reflections at each point on the contour map. Small differences in the combination of signal and noise make large variations in the contours, hence masking the desired result.

Generally speaking, the positive identification of lithology or rock type is confined to information obtained at outcrops or in drilled wells. Persistence of lithological identity along strata delineated by the seismic method is generally assumed.

A given rock stratum is laterally continuous by reason of having been laid down or formed contemporaneously throughout its lateral extent. It is, however, well known that economically significant accumulations of petroleum or natural gas are frequently identified with lateral changes in the lithological character of a stratum. To detect changes in the lithology of a stratum, the use of reflection seismic data has long been a goal of the seismic exploration industry. There are a number of seismic parameters that are known to be related to the lithological character of rock structure. These parameters will be referred to herein as seismic properties and include for example, the normalized energy of the seismic waves occurring in a local interval or zone appearing on a seismic section at a given time and spatial location along the line of survey. The reflected energy from a given rock stratum is well known to vary locally to some degree with changes in the composition of the rock stratum and to a larger degree with local changes in the nature of the fluids contained within the stratum; those rock strata which locally contain petroleum or gas as opposed to water may be observed as local anomalies in the reflected seismic energy. The visual correlation of anomalies in such properties, as energy observed in the seismic waves, with information as to discontinuities on the seismic record section gives a new dimension of information for the interpretation of seismic record sections.

Some other seismic properties which are useful in the interpretation of the lithologic character of rocks but require transforming the seismic data, occurring at a given point in time and space, from the time domain to the frequency domain before extracting the desired property from the resulting amplitude spectrum, include the peak frequency, the energy weighted frequency, total energy in the spectrum, energy in a band limited portion of the spectrum, energy at a discrete frequency, and the ratio of energy in one band limited portion to the energy in another band limited portion. Other properties, indirectly associated with the seismic waves in time and space, which may be extracted are the RMS velocity, the instantaneous or interval velocity, and the average velocity.

SUMMARY OF THE INVENTION

This invention provides a new means of seismograph surveying by extracting certain seismic parameters or properties from a seismic wave and displaying them in a novel manner such as to facilitate rapid interpretation of lateral variations of seismic properties as they may relate to the variations of lithologic character in the subterranean strata.

In accordance with one preferred aspect of the invention, a seismic record section that has been obtained in the conventional manner is analyzed to determine one or more sets of guidelines which will be used in connection with the extraction of seismic properties which follows. The guidelines may be arbitrarily established without regard to geologic structure or may be established in correlation or association with geologic structure such as lateral alignments, horizons or boundaries.

In the preferred form of the invention, the seismic data from which the seismic properties are to be extracted has not been subjected to signal-dependent automatic gain control. The desired seismic property is then extracted from the seismic waves of each trace of the seismic record section within zones bounded by a pair of adjacent guidelines.

For display purposes, a reference axis for each such zone is then established as the mean time between vertically adjacent guidelines. The magnitude of the selected property for each zone of each trace is plotted as a positive "Y" deflection above the appropriate reference axis, and the ratio of this value to the value observed in the next zone below is plotted as a negative Y deflection below the same reference axis. For a given stratum, the time reference points are connected from trace to trace to form a continuous curve delineating the stratum in reference to the seismic record section. All of the Y deflections associated with a given reference axis are first examined to determine a suitable scale factor for plotting, then the upward Y deflections are connected together from trace to trace to form a continuous curve or envelope lying always above the reference time axis whereas the downward Y deflections are connected together to form a continuous curve or envelope lying always below the reference axis.

The result of plotting the envelope of the magnitude of the seismic property above the reference axis and the envelope of ratio of the property below the same reference axis is to present a graphic demonstration of the lateral variations of the seismic property observed within a given stratum which emphasizes those variations which are most probably due to local changes in the stratum. If the observed lateral variation of the seismic property is due primarily to changes induced by the overlying strata, the lower envelope will tend to parallel the reference axis since the next lower strata will also be similarly effected by the common overlying strata. However, if the observed variation of the seismic property is primarily due to local changes in the reference stratum alone and there is no similar local change in the property for the stratum below from which the ratio is computed, then the upper and lower envelopes will tend to be symmetrical about the reference axis.

The plotting for all strata may be done on an opaque record sheet or may be done on a material that is transparent so that the record sheet can be overlaid with the corresponding seismic record section.

BRIEF DESCRIPTION OF THE DRAWINGS

The accompanying drawings are described as follows:

FIG. 1 is a diagrammatic representation of a typical geologic section undergoing seismographic surveying;

FIG. 2 represents an idealized set of seismic traces of a seismic record section corresponding with the geologic section of FIG. 1;

FIG. 3 is a display of variation in a seismic property in accordance with one embodiment of the present invention;

DESCRIPTION OF SPECIFIC EMBODIMENTS

Figure 4:
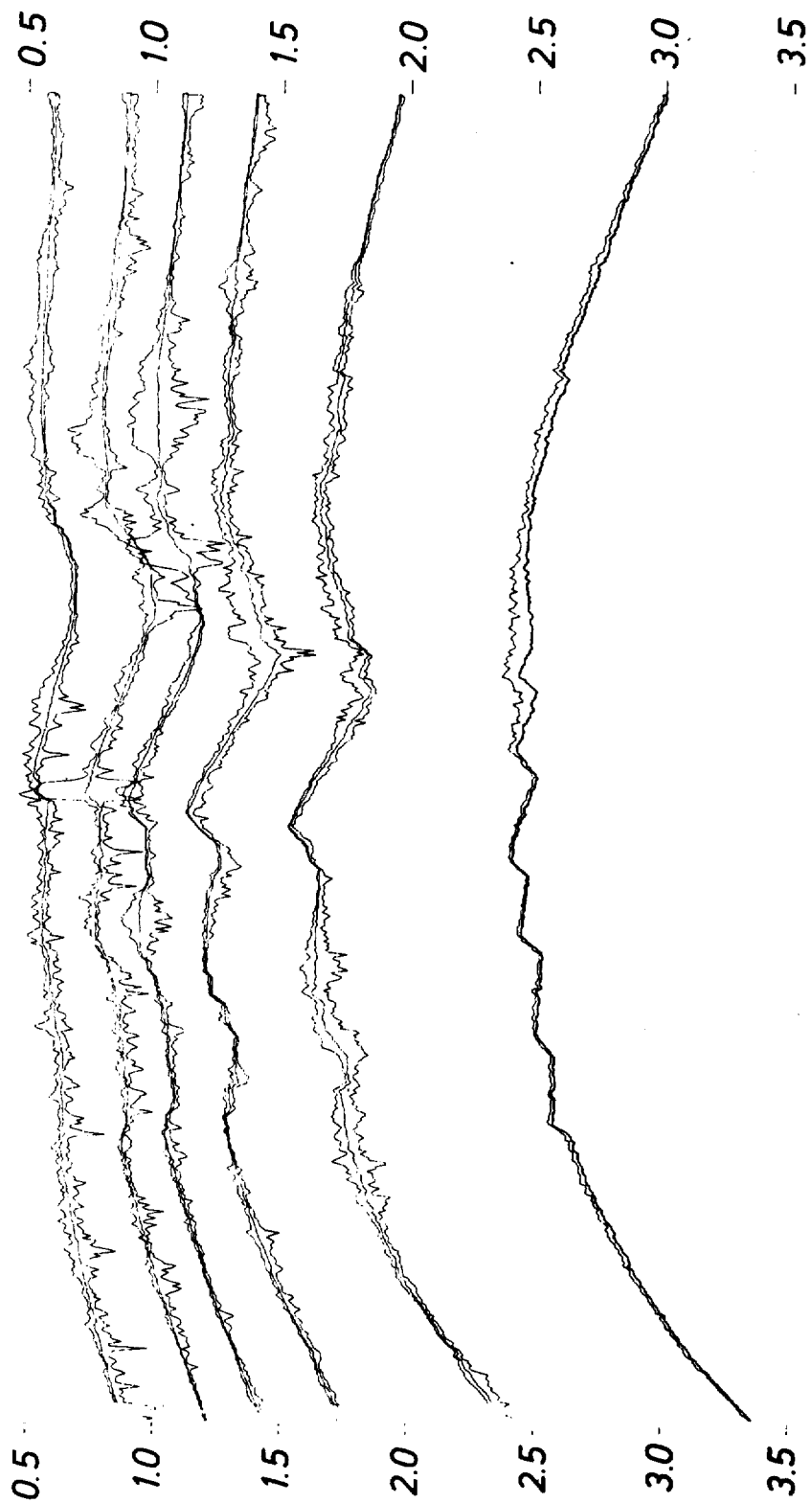
FIG. 4 is a reduced photographic facsimile of a display produced in accordance with one embodiment of the present invention in which the seismic property is the band limited normalized energy of the amplitude spectrum of the seismic waves occurring in various geologic strata.

It will be appreciated that the present invention can take many forms and embodiments, all of which would be impossible to describe or illustrate here. A limited number of forms of the invention and equipment embodying the invention will be described and illustrated for the purpose of giving an understanding of the invention. The true essence and spirit of the invention is defined in the appended claims, and it is not intended that the limited embodiments described in this specification and shown in the drawings should limit the invention.

General Description — FIGS. 1, 2 and 3

Referring to FIG. 1, there is shown a plurality of subsurface formations (rock strata) 10, a "shotpoint" 12 and an array of seismometers $S_1$-$S_{11}$. The seismometers $S_1$-$S_{11}$ translate the reflected seismic waves resulting from the disturbance created at the shotpoint 12 into a plurality of electrical signals having distinct amplitude and frequency characteristics. A cable 16 couples the separate outputs of the seismometers $S_4$-$S_{11}$ to a multi-channel analog-to-digital converter and multiplexer system 18. The seismic amplitude data is stored on a recording medium such as digital tape (not shown) by means of a recording system 20. The recording on the recording medium is generally made in the field at the point where data gathering occurs and is transported physically to a data processing center. For convenience and ease of understanding, the output of the recorder 20 is shown directly coupled to a processing device shown in the form of a digital computer 22. The digital computer 22 performs mathematical manipulations necessary to process the data in accordance with techniques that are standard in the art and unrelated to the present invention, but also may execute the steps necessary to implementing the present invention. The digital computer 22 operates under control of a programmer 24. An automatic plotter 26 is coupled to the output of the digital computer 22 to produce a display on a recording medium that can be used for interpretation in accordance with the present invention.

In FIG. 2 is shown an idealized set of seismic traces $A_1$–$A_{11}$ resulting from a seismic record section such as might be recorded with the recording apparatus shown in FIG. 1. The traces $A_1$–$A_{11}$ shown in FIG. 2 are placed side by side the rock formations shown in FIG. 1 and to the same scale to illustrate that the discontinuity or layers between rock zones corresponds with wave character that persists across the set of traces. For example, along the dashed line denoted $T_1$ are a series of wavelets that have a common character and can be interpreted to correspond with a rock layer in the earth. Likewise, a series of other common wavelets are shown to be denoted by dashed lines and the notation $T_2$, $T_3$, and $T_4$.

As a first step in the present embodiment of the invention, a standard seismic record section, that has preferably not been subjected to data dependent gain control, is first marked with desired guidelines that will be used in the extraction steps that follow. These guidelines may be selected arbitrarily without regard to geologic structure; for example, isotime lines at 0.5 second intervals. Alternatively, and sometimes preferably, the guidelines may be chosen to associate or correlate at least in part with geologic structure such as lateral alignments, horizons or boundaries. The guidelines selected may be either continuous or discontinuous across the record section. A simple case is illustrated in FIG. 2 where all horizons are essentially flat.

The marking of the guidelines can take a number of forms. In one preferred method a human interpreter may examine a seismic record and make markings by means of pencil, ink, or otherwise across a visual record section. The coordinates of the markings intercepting such trace can then be digitally encoded to define the location of the guidelines for digital computer analysis. The number of traces in a given record section, however, may be so large as to make it impractical to input into a digital computer the coordinates of the intercept of the guidelines for each trace.

At least two methods may be used to make it more efficient to establish the digital code for each of these guidelines. First, there are available standard digitizing devices that will cause the coordinates of a stylus to be input in digitally encoded form. An operator can use such a digital encoding device to manually trace a stylus on the guidelines of a marked seismic record section to input the digital coordinates. A second, and perhaps preferred way, is to use correlation techniques in a digital computer to define lateral persistence of common events. A series of coordinates may be input at widely spaced points along the traverse to serve as "beacon points" for the correlation process.

The next step of this embodiment of the invention is to extract the desired seismic properties. For example, suppose that the desired seismic property to be extracted is the band limited energy in the amplitude spectrum. The seismic property can be extracted at or about a given guideline or within the entire interval between a pair of adjacent guidelines. For example, the seismic property can be extracted from a time gate or zone centered on each guideline. Thus, for example, if the guideline $T_1$ is chosen, a time gate, say on the order of 400 milliseconds wide centered on $T_1$, may be used for selection of the seismic property.

The waves extracted from a zone are preferably smoothed with a smoothing operator to reduce effect of discontinuities from the transform. The smoothing is preferably done with a "hanning" smoothing operator which is the half cycle of a cosine squared wave. This wave has a value beginning at the beginning of the gate of zero, a value at the center of the gate of one, and a value at the end of the gate of zero.

After applying the smoothing operator, the seismic waves within the selected zone are transformed to the frequency domain to determine an amplitude spectrum. Operations are then performed to compute the sum of the squares of the amplitudes within a given bandwidth of the amplitude spectrum. The magnitude of this computed value which is the band limited energy will then be displayed as part of the record sheet produced in accordance with this embodiment of the invention.

The seismic property can also be extracted from the seismic waves between guidelines. For example, if the zone between $T_1$ and $T_2$ is chosen, the seismic waves within this zone are preferably smoothed with a hanning operator whose length matches this time interval. The smoothed data are then transformed to the frequency domain to determine an amplitude spectrum. Operations are then performed to compute the sum of the squares of the amplitudes within a given bandwidth of the amplitude spectrum. The resultant value may then be divided by the length of the interval from $T_1$ to $T_2$ to provide a normalized result. Normalization is preferred since the width of the zone may vary from trace to trace across the record section. The resultant value is the band limited normalized energy of the zone between $T_1$ and $T_2$.

Referring now to FIG. 3 there is illustrated a diagrammatic example of a record sheet produced in accordance with one embodiment of the invention. The horizontal and vertical scales are the same as those shown in connection with FIGS. 1 and 2. The horizontal positions $A_1$–$A_{11}$ correspond with the corresponding trace position $a_1$–$a_{11}$ in FIG. 2. The seismic property illustrated is the band limited normalized energy from within the zones between guidelines. The presently preferred reference axis about which the selected seismic property is plotted for zones lying between guidelines is the mean location between adjacent guidelines which define the zone. For example, the selected reference axis between the guidelines $T_1$ and $T_2$ in FIG. 2 is shown in FIG. 3 by the solid line denoted at the side by $(T_1 + T_2)/2$. Other reference axes are similarly defined by the mean between adjacent guidelines. The selected property is plotted as single valued function above the reference axis for the zone, $T_1$ to $T_2$, to yield an upper envelope 28 as shown in FIG. 3.

In accordance with a preferred form of the invention, a further value derived from the selected seismic property is also plotted below the reference axis. As shown in FIG. 3, the value of the property derived from the data in the interval, $T_1$ to $T_2$, is divided by the value derived from the data in the next deeper zone, $T_2$ to $T_3$, to determine their ratio. This ratio is plotted as an envelope 30 below the reference axis for the zone, $T_1$ to $T_2$, as is shown in FIG. 3. The envelopes 28 and 30 are shown in FIG. 3 as dashed lines because there is insufficient density of points at intercepts with the seismic traces in the illustration to make a continuous curve. In actual practice, the density of seismic traces on a record section is sufficient to create the appearance of a continuous curve.

The effect of this plotting of both the magnitude at one zone and the ratio between it and the next zone is to produce symmetrical envelopes about the reference axis only when the lower member has no variations of its property laterally. Then and only then will there be a completely symmetric envelope varying about the reference axis (mean time).

FIG. 4

In FIG. 4 is shown a reduced photographic facsimile of a display produced in accordance with the present invention for the band limited normalized energy of the seismic signal contained within a series of zones bounded by selected guidelines and plotted about reference axes as illustrated in FIG. 3. The displays such as shown in FIG. 4 can be used directly for interpretation in black and white form, but coloring is preferably applied to denote all of the area between the envelopes surrounding the same reference axis. Such coloring gives a graphic identity to the lateral variation of the property across the section.

FIG. 5

Figure 5:
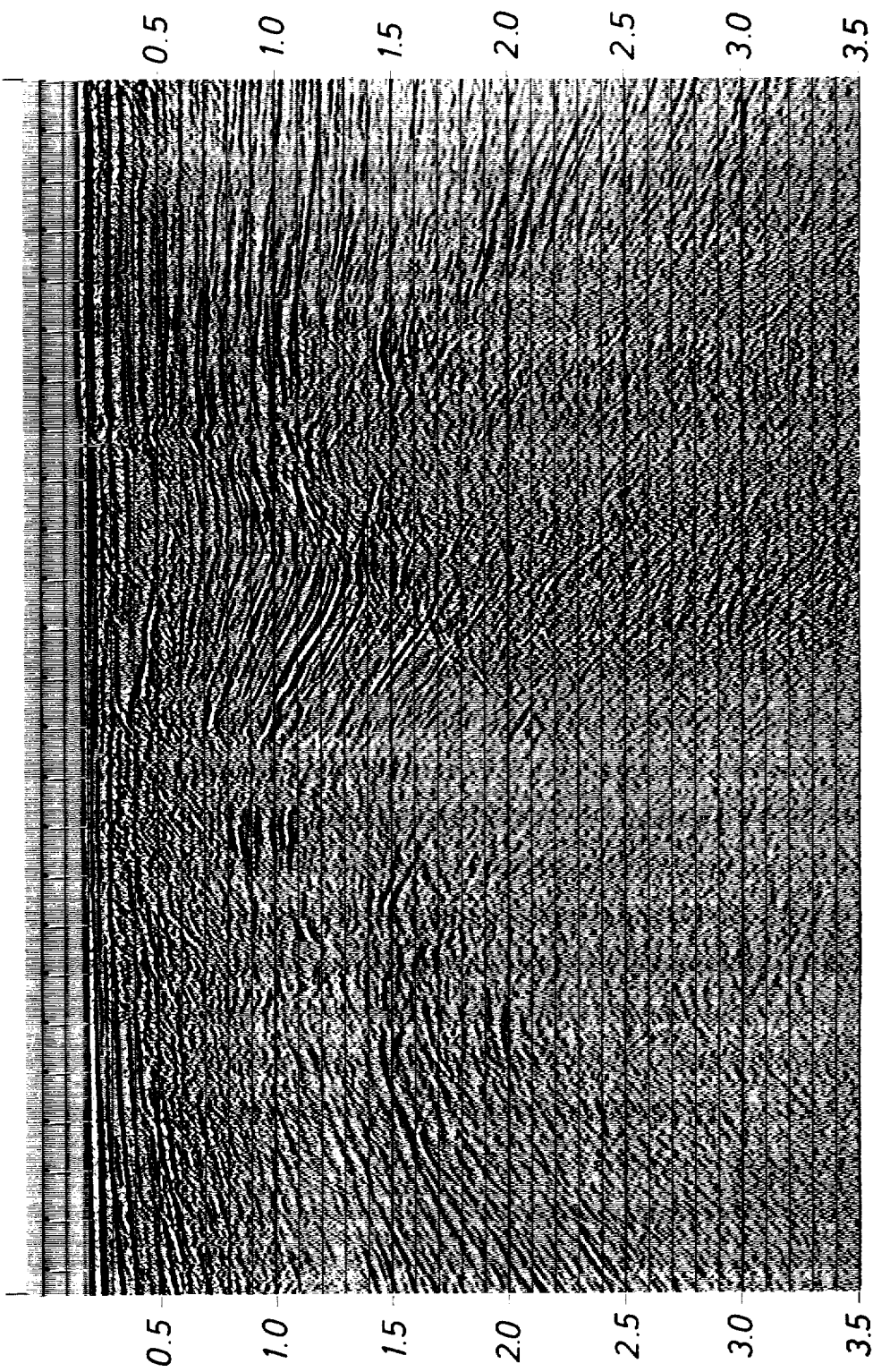
FIG. 5 is a reduced photographic facsimile of the seismic record section from which the seismic property displayed in FIG. 4 was extracted and to the same scale as FIG. 4.

In FIG. 5 is shown a reduced reproduction of a standard seismic record section from which the seismic property displayed in FIG. 4 was extracted and to the same scale.

Superposition of displays of the type shown in FIG. 4 can be executed on the same record surface with standard plotters, but the preferred method is to plot each seismic property on a separate record sheet. The seismic property plots can be placed upon transparent overlay sheets which are then superimposed upon an underlying seismic time record sheet such as that of FIG. 5 or upon plots of other seismic properties.

In FIG. 3, a large local anomaly pattern 32 is seen within the interval $T_1$ to $T_2$. The pattern is seen to be symmetric about the reference axis $$\frac{(T_1 + T_2)}{2}.$$

indicating that the anomaly is most probably induced by a localized change within the strata bounded by $T_1$ and $T_2$. In the idealized case illustrated, this anomaly of FIG. 3 corresponds to the sandstone body 34 contained within the shale formation of FIG. 1. In actual practice, the geological nature of the change within the stratum causing this anomalous variation of this particular seismic property is never certain. However, such a display will serve to locate anomalous conditions. A series of such displays, each displaying the variances of a different seismic property, can yield a synergistic result for geological interpretation of seismic record sections.

Other Seismic Properties

Some of the other seismic properties which can be used in accordance with the present invention include:

1. The normalized effective amplitude of the seismic waves which is defined by the following equation:

$$P_1 = \left( \frac{1}{2\Delta t} \sum_{t=T-\Delta t}^{T+\Delta t} y_t^2 \right)^{1/2} \quad (1)$$

where
T is the reference axis for extraction and plotting;
$\Delta t$ is one-half the length of a zone centered at $T$; and
$y_t$ is the amplitude of the seismic wave at time $t$ within the zone.

2. The normalized energy of the seismic waves which is defined by the following equation:

$$P_2 = \frac{1}{2\Delta t} \sum_{t=T-\Delta t}^{T+\Delta t} y_t^2 \quad (2)$$

where $T$, $\Delta t$, and $y_t$ are as defined in connection with equation (1) above.

3. The peak frequency in the amplitude spectrum of the seismic waves which is defined by the following postulates:

let $A(f)$ represent the resultant amplitude spectrum of the discrete fourier transform of a portion of a seismic wave contained within the limits $T - \Delta t$ and $T + \Delta t$; (3)

then, $P_3$, the peak frequency, is defined as that frequency within $A(f)$ corresponding to the largest amplitude value:
where $T$ and $\Delta t$ are as defined in equation (1).

It will be obvious to those skilled in the art that band limits may be imposed upon the amplitude spectrum to exlude frequency-dependent seismic noises from pertubating this property as well as any other properties derived from the amplitude spectrum. It will be equally obvious to those skilled in the art that the term band limit may refer to the entire amplitude spectrum if the upper and lower limits of frequency are appropriately chosen.

4. The band limited normalized energy in the amplitude spectrum of the seismic waves which is defined in the following manner:

$$P_4 = \frac{1}{2\Delta t} \sum_{f=FL}^{FH} |A(f)|^2 \quad (4)$$

where
FL is the lower limit of frequency of the bandpass;
FH is the upper limit of frequency of the bandpass;
$\Delta t$ is as defined in equation (1);
and $A(f)$ is as defined in conjunction with relation (3).

5. The energy weighted average frequency of the amplitude spectrum of the seismic waves which is defined as follows:

$$P_5 = \left( \sum_{f=FL}^{FH} |A(f)|^2 \times f \right) \Bigg/ \sum_{f=FL}^{FH} |A(f)|^2 \quad (5)$$

where FL, FH, and $A(f)$ are defined as in (4).

6. The normalized energy observed at any desired frequency within the amplitude spectrum of the seismic waves which is described as:

$$P_6 = \frac{1}{2\Delta t} |A(f_i)|^2 \quad (6)$$

where
$i$ identifies any discrete frequency, and
$A(f)$ and $\Delta t$ are as described in (3).

7. The ratio of energies observed in different band limited portions of the amplitude spectrum.

8. The root-mean-square velocity of the seismic waves which can be computed by means well known to those skilled in the art.

9. The normalized energy in the amplitude spectrum.

10. The interval velocity which can be computed from the RMS velocities by means well known to those skilled in the art.

11. The average velocity which can be computed by well known means.

Alternative Extraction/Display Embodiments

As a further possibility for the display format in accordance with the present invention, the seismic property may be extracted from a zone centered on or bridging each guideline. For example, a zone of 200 milliseconds duration located symmetrically about guideline $T_1$ of FIG. 2 might be used to extract the seismic property; then the extracted property and ratio envelopes would be plotted with the guideline $T_1$ itself as the reference axis.

In still other forms of the invention, the zone for extraction might be chosen to lie entirely above or entirely below the guideline or in some non-symmetrical manner upon the guideline. In still other forms of the invention, it may be desirable to substitute an envelope representing the absolute value of the difference in magnitude of the seismic property for the ratio envelope as described above. In still other forms of the invention, it may be desirable to plot only the envelope of the magnitude of the seismic property.

In yet another form of the invention, it may be desirable to determine the average value of the seismic property associated with any given reference axis and to plot the deviations from the average as an envelope which will lie above the reference axis where any local value is greater than the average and below the reference axis where local values are less than the average. This display format is particularly useful in displaying velocity data.

It will, of course, be realized that while reference has been made above to time scales and time boundaries, that the principles of the present invention apply equally to seismic information that has been converted from a time scale to a depth scale.

It will, of course, be realized that the guidelines selected need not conform to a geologic interpretation of the record section but may be selected in any manner desired. For example, isotime lines may be selected at one-half second time intervals to serve as guidelines.

The process in accordance with the present invention is preferably carried out with a modern-day digital processing system of a type such as the Control Data Corporation Model 3200 with the usual peripheral devices adapted to seismic data processing. The plotter used for making the plots in accordance with the present invention can be of any number adapted to operate on-line or off-line with the digital computer. For example, a suitable plotter is a Calcomp Model 763 available from the California Computer Products, Inc., Anaheim, Calif.

While the preferred practice of the invention is in the digital mode, all or part of the steps may be executed in the analog mode. For example, plotting can be executed by an analog plotter such as an X-Y plotter available from the Houston Instrument Division of Bausch and Lomb, Bellaire, Tex. The extraction step can be executed by many types of analog computers such as the type available from Astrosystems, Inc., Fullerton, Colo.

It is believed that sufficient information is given herein to enable those in the seismic industry of ordinary skill to carry out the present invention. Out of an abundance of caution, however, the program language listing for digital execution of the extraction and plotting steps of the invention is included herein as an appendix. This listing is given in FORTRAN language and is adapted for running on a Control Data Corporation Model 3200 Digital Computer. The FORTRAN language is fully explained in many common texts including:

Control Data Corporation, FORTRAN Reference Manual, Computer Systems No. 600-576-00C or Subsequent Revision, Minneapolis, Minn.

User notes relating to the use of the programs are also included in the appendix below.

APPENDIX

PROGRAM DESCRIPTION - CXPICK1 Form Number 1

I. IDENTIFICATION

| | | |
|---|---|---|
| A. | Program Name | CXPICK1 |
| B. | Program Number | 3203.00 |
| C. | Programmer | Cliff Ray |
| D. | Date | November 13, 1972 |
| E. | Documented by | Cliff Ray |
| F. | Compiler Language | FORTRAN/COMPASS |

II. INTRODUCTION AND PURPOSE

This program takes given starting times for events and correlates them across a section using Cross Correlation. An output tape is generated which may be input to plot programs to display the picks as well as amplitude, energy and frequency information.

3200 MSOS CONTROL CARDS CXPICK1 Form No. 2

Entries begin in column one, unless specified otherwise, and there should be no blanks before the free field.

| | |
|---|---|
| Card 1 | 7/9 SEQUENCE, 123, free field |
| Card 2 | 7/9 JOB, work order no., user's name |
| Card 3 | 7/9 EQUIP, 10=MT, 20=MT, 21=MT |
| Card 4 | 7/9 ACCTSTRT,P=CXPICK1 r=yyy  yyy=Number of records to process |
| Card 5 | ACCTSTRT,C=xxx-x (column 2-17) xxx-x=Run Code with group number |
| Card 6 | 7/9 CXPICK1 |
| | Data Cards |
| Card 7 | FINIS (columns 10-14) |
| Card 8 | 7/9 ACCTEND |
| Card 9 | 7/8 7/8 EOF |

DATA CARD FORMAT CXPICK1 Form No. 3

PROGRAM:
FORMAT: All format is I5 unless otherwise specified

| CARD NO. | COLUMN NO. | | DESCRIPTION | |
|---|---|---|---|---|
| 1 | 1–5 | LR | Length of record (ms) (maximum of 3000 samples) | |
| | 6–10 | ISI | Sample Interval (ms) | |
| | 11–15 | IFTR | First trace to process | |
| | 16–20 | NTIMES | Number of specified event times (maximum 50) - (specified on card 2) | |
| | 21–25 | IGATE | Length of correlation gate (ms) (set to 200 (ms) if Blank) | |
| | 26–30 | IDECM | Plus or minus correlation search increment (ms) | |
| | 31–35 | IDEZ | 0 Interpolation option for picking (skip card 2 and use cards 3 & 4) | |
| | | | 1 NO interpolation (use card 2 and skip cards 3 & 4) | |
| | 36–40 | ILOW | Low frequency cutoff | |
| | 41–45 | IHIGH | High frequency cutoff (set to 55 if Blank) | |
| | 46–50 | IALPHA | Percent test for correlation acceptance | |
| | 51–55 | IFEVAL | Evaluation frequency for energy | |
| | 56–60 | IPKONLY | 0 Perform full analysis | |
| | | | 1 Pick events only | |
| | 61–65 | IPTS | Window length for frequency analysis on each event. | |
| | | | 0 or Blank | Performs frequency analysis only in Interval |
| | 66–70 | ITAPE | 0 or Blank | No SIPP tape output |
| | | | 1 | Gives SIPP tape output with all printout. |
| | 71–75 | IPTOPT | 0 or Blank | Does not printout poor correlation values |
| | | | 1 | Prints out poor correlation values |

—Continued

| PROGRAM CARD NO. | FORMAT: All format is I5 unless otherwise specified COLUMN NO. | | DESCRIPTION |
|---|---|---|---|
| 2 | 1–5 | NTR | Number of traces for which the following start times apply |
| | 6–10 | TT(1) | 1st event start time |
| | 11–15 | TT(2) | 2nd event start time |
| 3 | 1–5 | IEVENT | Consecutive event number for which the following card file no.-time pairs apply. |
| | 6–10 | NOPRS | Number of file no.-time pairs for this event. |
| 4 | 1–5 | IFNO(1) | First file number for specified time |
| | 6–10 | ITIM(1) | Specified time for first file |
| | 11–15 | IFNO(2) | 2nd file no. for specified time |
| | 16–20 | ITIM(2) | Specified time for 2nd file |
| | | IFNO(noprs) | NOPRS file no. for specified time |
| | | IFNO(noprs) | Specified time for NOPRS file |

Use as many card 4's as needed to identify the number of file no.-time pairs specified on card 3. (Not to exceed 50 pairs)

Cards 3 & 4 should be repeated for each event if there are more than 240 traces to process.
See SPECIAL Note.

| | Blank Card | | Terminates Job |

SPECIAL NOTES CXPICK1

If more than 240 files are to be processed then the input file number-time pairs must be broken up into 240 file segments. The set of cards 3 and 4 are repeated until all segments have been specified. See following example:

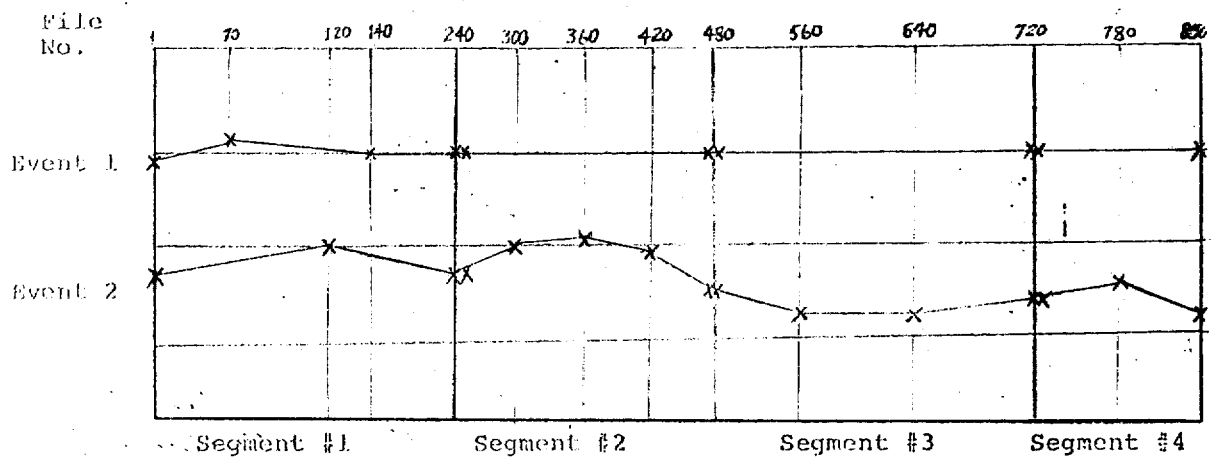

| | Card 1 Col. No. | 5 | 10 | 15 | (appropriate Data Values) 20 | 25 | 30 | 35 | 40 | 45 | 50 |
|---|---|---|---|---|---|---|---|---|---|---|---|
| | Card 3 | 1 | 4 | | | | | | | | |
| | Card 4 | 1 | 1080 | 70 | 950 | 140 | 1000 | 240 | 1000 | | |
| Seg No.1 | Card 3 | 2 | 3 | | | | | | | | |
| | Card 4 | 1 | 2300 | 120 | 2000 | 240 | 2300 | | | | |
| | Card 3 | 1 | 2 | | | | | | | | |
| Seg No.2 | Card 4 | 241 | 1000 | 480 | 1000 | | | | | | |
| | Card 3 | 2 | 5 | | | | | | | | |
| | Card 4 | 241 | 2300 | 300 | 2000 | 360 | 1900 | 420 | 2100 | 480 | 2500 |
| | Card 3 | 1 | 2 | | | | | | | | |
| Seg No.3 | Card 4 | 481 | 1000 | 720 | 1000 | | | | | | |
| | Card 3 | 2 | 4 | | | | | | | | |
| | Card 4 | 481 | 2500 | 560 | 2800 | 640 | 2900 | 720 | 2800 | | |
| | Card 3 | 1 | 2 | | | | | | | | |
| Seg No.4 | Card 4 | 721 | 1000 | 850 | 1000 | | | | | | |
| | Card 3 | 2 | 3 | | | | | | | | |
| | Card 4 | 721 | 2800 | 780 | 2600 | 850 | 2700 | | | | |
| | | | | | Blank Card | | | | | | |

PROGRAMMING INFORMATION — CXPICK1
Form No. 4
I. DETAILED PROGRAM DESCRIPTION A. Input
  7-Track
B. Output
  7-Track reel having 24 × NTIMES samples per output trace.
C. Programming Methods — verbal flow chart Include all subprograms (i.e. subroutines that are used solely by the particular program). Indicate any I/O that occurs within the subprogram.

Input reel header is handled and then the input data card 1 is read. Parameters are set and input reel skips to starting trace number then data card 2 or card's 3 and 4 are read. The FMU is initialized and smoothing parameter computed. A Do Loop is then entered to correlate each succeeding trace event against a running total. Each time a time is specified TOTANAL is called which does amplitude, energy and frequency analysis on the events and then outputs the information on an output tape. The correlation process is continued until all specified traces have been correlated. A Blank card terminates the program.

```
          PROGRAM CXPICK1
          COMMON FDAT(50),IA(3000)
          COMMON IT(50),ISUM(175,50),SM0(175),IHOLD(175)
          DIMENSION IC(102),HITR(50),IFNO(50),ITIM(50)
          NMSTR = 1
          NST = 2
          NTOTALKT = 0
          DO 9 I=1,50
          NKTR(I) = 0
        9 FDAT(I) = 0
          PI = 3.1415927
          ISTKT = 0
          KTR = 0
          BUFFER IN(10,0)(IA,IA(40))
       10 GO TO(10,20),UNITSTF(10)
       20 PRINT 30,(IA(I),I=1,40)
       30 FORMAT(20H INPUT REEL HEADER   ,20A4,/,20X,20A4,/)
          READ 40,LR,ISI,IFTR,NTIMES,IGATE,IDELTA,IDE2,ILOW,IHIGH,IALPHA,IFE
         XVAL,IPKONLY,IPTS,ITAPE,IPTOPT
          IF(ITAPE)1,2
        1 WRITE(21,30) (IA(I),I=1,40)
        2 CONTINUE
          IF(ITAPE) PRINT 31
       31 FORMAT(/,24H PRINT TAPE IS REQUESTED,/)
          IF(ITAPE)WRITE(21,31)
          IF(IGATE/ISI.GT.175) IGATE = 175*ISI
          IF(IGATE.EQ.0) IGATE = 200
          IF(IHIGH.EQ.0) IHIGH = 55
       40 FORMAT(16I5)
          PRINT 41,LR,ISI,IFTR,NTIMES,IGATE,IDELTA,ILOW,IHIGH,IALPHA,IFEVAL
          IF(ITAPE)3,4
        3 WRITE(21,41) LR,ISI,IFTR,NTIMES,IGATE,IDELTA,ILOW,IHIGH,IALPHA,IFE
         XVAL
        4 CONTINUE
       41 FORMAT(13H TRACE LENGTH,37X,I5,/,18H SAMPLE INTERVAL,34X,I5,/,23H
         1FIRST TRACE TO PROCESS,27X,I5,/,28H NO. OF EVENT STARTING TIMES,22
         2X,I5,/,31H LENGTH OF GATE FOR CORRELATION,19X,I5,/,43H PLUS OR MIN
         3US CORRELATION SEARCH INCREMENT, 7X,I5,/,21H LOW FREQUENCY CUTOFF,
         429X,I5,/,22H HIGH FREQUENCY CUTOFF,28X,I5,/,40H PERCENT TEST FOR C
         5ORRELATION ACCEPTANCE,10X,I5,/,21H EVALUATION FREQUENCY,29X,I5,//)
          IF(IPKONLY)42,44
       42 PRINT 43
          IF(ITAPE)WRITE(21,43)
       43 FORMAT(55H *******************************************************,
         1/,35H PICK ONLY OPTION HAS BEEN SELECTED,/,55H *******************
         2*******************************************,//)
          GO TO 49
       44 IF(IDE2)45,47
       45 PRINT 46
          IF(ITAPE)5,6
        5 WRITE(21,46)
        6 CONTINUE
       46 FORMAT(55H AUTOMATIC CORRELATION APPLIED WITH STARTING TIMES ONLY,
         X//)
          GO TO 49
       47 PRINT 48
          IF(ITAPE)WRITE(21,48)
       48 FORMAT(47H SPECIFIED INTERPOLATION TIMES WITH CORRELATION,//)
       49 CONTINUE
          IF(IPTS)54,56
       54 PRINT 55,IPTS
          IF(ITAPE)7,8
        7 WRITE(21,55) IPTS
        8 CONTINUE
       55 FORMAT(47H WINDOW LENGTH FOR FREQ. ANALYSIS ON EACH EVENT,3X,I5,/
         X)
       56 CONTINUE
          ALPHA = IALPHA/50.
          KTR = IFTR - 1
          NS = LR/ISI
          LGT = IGATE/ISI
          IDEL = IDELTA/ISI
          IPTS = IPTS/ISI
          LGT = (LGT/2)*2 + 1
          LGTD2 = LGT/2
          PI = 3.1415927
          ISKP = IFTR - 1
          DO 80 I=1,ISKP
          BUFFER IN(10,1)(IA,IA(2))
       70 GO TO(70,80,90,80),UNITSTF(10)
       80 CONTINUE
          GO TO 120
       90 PRINT 100
          IF(ITAPE)WRITE(21,100)
      100 FORMAT(46H EOF ENCOUNTERED WHILE SKIPPING TO FIRST TRACE)
          PRINT 110
          IF(ITAPE)WRITE(21,110)
      110 FORMAT(12H END CXPICK1)
          WRITE(59,110)
          REWIND 10
          RETURN
```

```
      -Continued
120   CONTINUE
      DO 60 I=1,50
      DO 60 J=1,175
60    ISUM(J,I) = 0
130   CALL FMUA(0,ISUM,8192,1,ISTAT,1)
140   GO TO(140,210,150,170),ISTAT + 1
150   PRINT 160
      IF(ITAPE)WRITE(21,160)
160   FORMAT(30H FMU ABNORMAL END OF OPERATION)
      REWIND 10
      WRITE(59,160)
      WRITE(59,110)
      PRINT 110
      IF(ITAPE)WRITE(21,110)
      RETURN
170   ISTKT = ISTKT + 1
      IF(ISTKT.GT.1)180,210
180   IF(ISTKT.LT.4)130,190
190   PRINT 200
      IF(ITAPE)WRITE(21,200)
200   FORMAT(36H FMU PARITY - 3 ATTEMPTS HAVE FAILED)
      WRITE(59,200)
      PRINT 110
      IF(ITAPE)WRITE(21,110)
      WRITE(59,110)
      REWIND 10
      RETURN
210   ISTKT = 0
211   CALL FMUB(0,ISUM,8192,1,ISTAT,1)
220   GO TO(220,250,150,230),ISTAT + 1
230   ISTKT = ISTKT + 1
      IF(ISTKT.GT.1)240,250
240   IF(ISTKT.LT.4)211,190
250   CONTINUE
      IF(IDE2)61,323
61    READ 40,NTR,(IT(I),I=1,NTIMES)
      IF(NTR)51,530
51    PRINT 53
      IF(ITAPE)WRITE(21,53)
      PRINT 52,NTR
      IF(ITAPE)1000,1001
1000  WRITE(21,52) NTR
1001  CONTINUE
52    FORMAT(24H STARTING TIMES APPLY TO,I5,3X,6HTRACES,//,31H STARTING
     XTIMES IN MILLISECONDS)
      PRINT 40,(IT(I),I=1,NTIMES)
      IF(ITAPE)1002,1003
1002  WRITE(21,40) (IT(I),I=1,NTIMES)
1003  CONTINUE
      DO 50 I=1,NTIMES
50    IT(I) = IT(I)/ISI
      PRINT 53
      IF(ITAPE)WRITE(21,53)
53    FORMAT(//)
      GO TO 4060
323   LOCSTT = 3200
      DO 4050 IPI=1,NTIMES
      READ 40,IEVENT,NOPRS
      IF(IEVENT)324,580
324   PRINT 4000,IEVENT,NOPRS
      IF(ITAPE)1004,1005
1004  WRITE(21,4000) IEVENT,NOPRS
1005  CONTINUE
4000  FORMAT(13H EVENT NUMBER,14X,I5,/,27H NUMBER OF TRACE-TIME PAIRS,I5
     X,/,29H INPUT TRACE-TIME PAIR VALUES)
      READ 40,(IFNO(I),ITIM(I),I=1,NOPRS)
      PRINT 4010,(IFNO(I),ITIM(I),I=1,NOPRS)
      IF(ITAPE)1006,1007
1006  WRITE(21,4010) (IFNO(I),ITIM(I),I=1,NOPRS)
1007  CONTINUE
4010  FORMAT(1X,I4,I5,24I5)
      PRINT 4011
      IF(ITAPE)WRITE(21,4011)
4011  FORMAT(//)
      NOPRSM1 = NOPRS - 1
      K = 1
      DO 4030 I=1,NOPRSM1
      IDELT = ITIM(I+1) - ITIM(I)
      IFNC = IFNO(I+1) - IFNO(I)
      IFNC = IABS(IFNC)
      DO 4020 J=1,IFNC
      IA(K) = ITIM(I) + (J-1)*IDELT/IFNC
4020  K = K + 1
4030  CONTINUE
      IA(K) = ITIM(NOPRS)
      NTR = K
      DO 4031 I=1,NTR
4031  IA(I) = IA(I)/ISI
      CALL FMUB(LOCSTT,IA,NTR,NTIMES,ISTAT,1)
4040  GO TO(4040,4050,150,150),ISTAT+1
4050  LOCSTT = LOCSTT + 1
      LOCSTT = 3200
4060  CONTINUE
      IF(NNSTK)4070,4100
4070  IF(IDE2)4090,4080
4080  CALL FMUR(LOCSTT,IT,NTIMES,ISTAT,1)
      LOCSTT = LOCSTT + NTIMES
4090  CONTINUE
      BUFFER IN(10,1)(IA,IA(NS))
260   GO TO(260,300,270,290),UNITSTF(10)
270   PRINT 280
      IF(ITAPE)WRITE(21,280)
280   FORMAT(16H EOF ENCOUNTERED)
      WRITE(59,280)
      PRINT 110
      WRITE(59,110)
      REWIND 10
      RETURN
290   CALL INPRTY(10,IA,NS,IEPR)
300   CONTINUE
      DO 301 I=1,10
301   IA(I) = 0
      DO 310 I=1,NTIMES
      II = IT(I) - LGTD2
```

```
            III = IT(I) + LGTO2
            K = 1
            DO 310 J=II,III
            ISUM(K,I) = ISUM(K,I) + IA(J)
310         K = K + 1
            DO 320 I=1,LGTO2
            II = I + LGTO2 + 1
            III = -I + LGTO2 + 1
            SMO(II) = .5*(1. + COS(PI*I/LGTO2))
            SMO(III) = SMO(II)
320         SMO(LGTO2 + 1) = 1.0
            KTR = KTR + 1
            CALL FMUB(100,IA,NS,1,ISTAT,1)
321         GO TO(321,322,150,150),ISTAT+1
322         CONTINUE
            CALL TOTANAL(IT,IA,NS,NTIMES,KTR,ISI,ILOW,IHIGH,IPTS,IFEVAL,IPKONL
           X7,ITAPE)
            NTOTALKT = NTOTALKT + 1
            NNSTK = 0
4100        CONTINUE
            ISTKT = 0
            DO 570 I=NST,NTR
            BUFFER IN(10,1)(IA,IA(NS))
            GO TO(330,350,331,340),UNITSTF(10)
330
331         PRINT 332
            IF(ITAPE)WRITE(21,332)
332         FORMAT(21H MOUNT NEW INPUT REEL)
            WRITE(59,332)
            PAUSE
            BUFFER IN(10,0)(IA,IA(40))
333         GO TO(333,334),UNITSTF(10)
334         PRINT 30,(IA(I22),I22=1,40)
            IF(ITAPE)1008,1009
1008        WRITE(21,30) (IA(I22),I22=1,40)
1009        CONTINUE
            GO TO 350
340         CALL INPRTY(10,IA,NS,IERR)
350         DO 360 J=1,10
360         IA(J) = 0
            NTOTALKT = NTOTALKT + 1
            DO 363 J=11,NS
            IABSZZ = IABS(IA(J))
            IF(IABSZZ.GT.8191)361,363
361         CALL LIMITS(NS,IA,KKTR)
            KTRP = KTR + 1
            PRINT 362,KKTR,KTRRP
362         FORMAT( ,15H LIMITS CHANGED,I5,18H   SAMPLES ON TRACE,I5, )
            GO TO 364
363         CONTINUE
364         CONTINUE
370         CALL FMUB(100,IA,NS,1,ISTAT,1)
380         GO TO(380,410,150,390),ISTAT + 1
390         ISTKT = ISTKT + 1
            IF(ISTKT.GT.1)400,410
400         IF(ISTKT.LT.4)370,130
410         ISTKT = 0
            IF(IDE2.EQ.0)CALL FMUR(LOCSTT,IT,NTIMES,ISTAT,1)
411         GO TO(411,412,150,150),ISTAT+1
412         LOCSTT = LOCSTT + NTIMES
            DO 560 J=1,NTIMES
            DO 420 K=1,LGT
420         IHOLD(K) = SMO(K)*ISUM(K,J)
430         CALL FMUA(3000,IHOLD,LGT,1,ISTAT,1)
440         GO TO(440,470,150,450),ISTAT + 1
450         ISTKT = ISTKT + 1
            IF(ISTKT.GT.1)460,470
460         IF(ISTKT.LT.4)430,190
470         ISTKT = 0
            LOCB = IT(J) - LGTO2 - IDEL + 99
            NB = LGT + 2*IDEL
            NC = 2*IDEL + 1
            LOCB2 = LOCB + LGT + 2*IDEL
            CALL FMUD(3000,LGT,LOCB,NB,IC,NC,1,1,1,1,ISTAT,LGT+3000,LOCB2)
480
490         GO TO(490,520,150,500),ISTAT+1
500         ISTKT = ISTKT + 1
            IF(ISTKT.GT.1)510,520
510         IF(ISTKT.LT.4)480,190
520         ISCL = 2048*LGT/51
            CALL SCAL48(NC,IC,ISCL)
            IBIG = IC(1)
            ISHFT = 1
            DO 540 K=2,NC
            IF(IC(K).GT.IBIG)530,540
530         IBIG = IC(K)
            ISHFT = K
540         CONTINUE
            IF(NST.EQ.2)531,542
531         IF(I.LT.7)541,543
541         FDAT(J) = FDAT(J) + IBIG
            NKTR(J) = NKTR(J) + 1
            GO TO 546
542         ITEST = ALPHA*FDAT(J)/NKTR(J)
            IF(IBIG.LT.ITEST)544,543
543         FDAT(J) = FDAT(J) + IBIG
            NKTR(J) = NKTR(J) + 1
            GO TO 546
544         IF(IPTOPT)566,547
566         CONTINUE
            PRINT 548
            IF(ITAPE)WRITE(21,548)
548         FORMAT(130H ****************************************************
           X****************************************************************
           X*********)
            FDATJJJ = FDAT(J)/NKTR(J)
            IF(IDE2)551,552
551         CONTINUE
            PRINT 545,KTR,J,FDATJJJ,IBIG
            IF(ITAPE)1010,1011
1010        WRITE(21,545) KTR,J,FDATJJJ,IBIG
1011        CONTINUE
545         FORMAT(26H POOR CORRELATION ON TRACE,I5,14H  EVENT NUMBER,I5, ,1
           X7HLAST PICK IS USED,5X,12HAVG. CORR. =,F10.0,3X,11HTR. CORR. =,I10
           X, )
            GO TO 547
```

—Continued

```
552     PRINT 553,KTR,J,FDATJJJ,IBIG
        IF(ITAPE)1012,1013
1012    WRITE(21,553) KTR,J,FDATJJJ,IBIG
1013    CONTINUE
553     FORMAT(26H POOR CORRELATION ON TRACE,I5,14H  EVENT NUMBER,I5,5X,27
       1H INTERPOLATION PICK IS USED,3X,12HAVG. CORR. =,F10.0,2X,11HTR. CO
       2RR. =,I10)
        GO TO 547
546     CONTINUE
        IT(J) = IT(J) + ISHFT - IDEL - 1
        DO 550 K=1,LGT
        KK = IT(J) - LGTD2 + K - 1
550     ISUM(K,J) = ISUM(K,J) + IA(KK)
547     CONTINUE
560     CONTINUE
        KTR = KTR + 1
        CALL TOTANAL(IT,IA,NS,NTIMES,KTR,ISI,ILOW,IHIGH,IPTS,IFEVAL,IPKONL
       XY,ITAPE)
570     CONTINUE
        NST = 1
        GO TO 323
580     CONTINUE
        PRINT 590,NTOTALKT
        IF(ITAPE)1014,1015
1014    WRITE(21,590) NTOTALKT
1015    CONTINUE
590     FORMAT(25H TOTAL TRACES PROCESSED =,I5)
        ENDFILE 20
        ENDFILE 30
        REWIND 20
        REWIND 10
        PRINT 110
        IF(ITAPE)WRITE(21,110)
        WRITE(59,110)
        RETURN
        END

SUBROUTINE TOTANAL(IT,IA,NS,NTIMES,KTR,ISI,ILOW,IHIGH,IPTS,IFEVAL,
       XIPKONLY,ITAPE)
        DIMENSION IT(2),IA(2),FW(50),DUMMY(600),FA(50),FWORK(50),
        DIMENSION NUMMY(1200),FSO(50),FENER(50),FPEAK(50),FAVER(50),
        DIMENSION IR(512),LU(64),FAA(50),FSO(50)
        DIMENSION FSOI(50),FPEAKI(50),FENERI(50),FAVERI(50)
        EQUIVALENCE (DUMMY,NUMMY)
        NTM1 = NTIMES - 1
        IF(IPKONLY.GT.0)1,2
1       CONTINUE
        DO 3 I=1,NTIMES
3       IT(I) = IT(I)*ISI
        PRINT 40,KTR,(IT(I),I=1,NTIMES)
        IF(ITAPE)2000,2001
2000    WRITE(21,40) KTR,(IT(I),I=1,NTIMES)
2001    CONTINUE
40      FORMAT(9H FILE NO.,I5,14H   PICKED TIMES,/,1X,25I5,/,1X,25I5)
        DO 4 I=1,NTIMES
4       IT(I) = IT(I)/ISI
        GO TO 245
2       CONTINUE
        JST = 2
        JOPT = 1
        DO 20 J=2,NTIMES
        IST = IT(J-1)
        IED = IT(J) - 1
        FWORK(J-1) = 0
        DO 10 I=IST,IED
10      FWORK(J-1) = FWORK(J-1) + FLOAT(IA(I))**2
20      FWORK(J-1) = FWORK(J-1)/(IED-IST + 1)
        NTM2 = NTM1 - 1
        FWORK(NTIMES) = 0
        DO 30 I=1,NTM2
30      FW(I) = FWORK(I)/FWORK(I+1)
        II2 = 32/ISI
        IIY = 16/ISI
        DO 63 I=1,NTIMES
        II = IT(I)
        II = II - IIY
        IS = II
        SML = FLOAT(IA(II))*IA(II)
        DO 62 J=1,II2
        JJ = IS + J
        SML = SML + FLOAT(IA(JJ))*IA(JJ)
62      CONTINUE
        FAA(I) = SQRT(SML)
63      CONTINUE
        DO 64 I=1,NTM1
64      FA(I) = FAA(I)/FAA(I+1)
        N = 7 + 4/ISI
        NFFT = 2**N
        DELF = 1000./(NFFT*ISI)
        PI = 3.1415927
        ILS = ILOW/DELF
        IHE = IHIGH/DELF
        IEVAL = IFEVAL/DELF
        IEVAL = 2*IEVAL + 1
        ILS = 2*ILS + 1
        IHE = 2*IHE + 1
        ILSM2 = ILS - 2
        IHEP2 = IHE + 2
134     DO 240 I=JST,NTIMES
        IF(JOPT)131,132
131     CONTINUE
        IST = IT(I-1)
        IED = IT(I) - 1
```

```
            ITOT = IED - IST + 1
            IF(ITOT.GT.NFFT-1)ITOT=NFFT-1
            ITOT = (ITOT/2)*2 + 1
            ITO2 = ITOT/2
            GO TO 133
 132        ITOT = (IPTS/2)*2 + 1
            IF(ITOT.GT.NFFT-1)ITOT=NFFT-1
            ITO2 = ITOT/2
            IST = IT(I) - ITO2
            IED = IT(I) + ITO2
 133        CONTINUE
            K = IST
            DO 130 J=1,ITOT
            W = .5*(1. - COS(PI*(J-1)/ITO2))
            IR(J) = IA(K)*W*1024.
 130        K = K + 1
            ITPN = ITOT + 1
            DO 140 J=ITPN,NFFT
 140        IR(J) = 0
            IOPT = -1
            ISC = -N+2
            CALL IFFTDF(IR,N,IOPT,ISC,LU)
            BIG = 0.0
            JJ = 1
            DO 190 J=3,ILSM2,2
            X = IR(J)
            Y = IR(J+1)
            SQ = X*X + Y*Y
            IF(SQ.GT.BIG)180,190
 180        BIG = SQ
            JJ = J
 190        CONTINUE
            SUM = 0.0
            BUM = 0.0
            DO 210 J=ILS,IHE,2
            X = IR(J)
            Y = IR(J+1)
            SQ = X*X + Y*Y
            BUM = BUM + SQ*((J-1)/2)
            SUM = SUM + SQ
            IF(SQ.GT.BIG) 200,210
 200        BIG = SQ
            JJ = J
 210        CONTINUE
            DO 230 J=IHEP2,NFFT,2
            X = IR(J)
            Y = IR(J+1)
            SQ = X*X + Y*Y
            IF(SQ.GT.BIG)220,230
 220        BIG = SQ
            JJ = J
 230        CONTINUE
            X = IR(IEVAL)
            Y = IR(IEVAL+1)
            TDIV = IED - IST + 1
            TMULT = 1./TDIV
            IF(JST.EQ.1)232,231
 231        CONTINUE
            F20(I-1) = X*X + Y*Y
            FPEAK(I-1) = ((JJ-1)/2)*DELF
            FENER(I-1) = SUM
            FAVER(I-1) = BUM*DELF/SUM
            F20(I-1) = F20(I-1)*TMULT
            FPEAK(I-1) = FPEAK(I-1)
            FENER(I-1) = FENER(I-1)*TMULT
            FAVER(I-1) = FAVER(I-1)
            GO TO 240
 232        F20(I) = (X*X + Y*Y)*TMULT
            FPEAK(I) = ((JJ-1)/2)*DELF
            FENER(I) = SUM*TMULT
            FAVER(I) = BUM*DELF/SUM
 240        CONTINUE
            IF(JST.EQ.1) GO TO 1030
            FPEAK(NTIMES) = 0
            FENER(NTIMES) = 0
            FAVER(NTIMES) = 0
            F20(NTIMES) = 0
            IF(JST.EQ.2)1000,1030
 1000       DO 1010 J=1,NTIMES
            F20I(J) = F20(J)
            FPEAKI(J) = FPEAK(J)
            FENERI(J) = FENER(J)
 1010       FAVERI(J) = FAVER(J)
            IF(IPTS)1020,1040
 1020       JST = 1
            JOPT = 0
            GO TO 134
 1030       CONTINUE
            IF(IPTS)1060,1040
 1040       DO 1050 J=1,NTIMES
            F20(J) = 0
            FPEAK(J) = 0
            FENER(J) = 0
 1050       FAVER(J) = 0
 1060       CONTINUE
            PRINT 1070,KTR
            IF(ITAPE)2002,2003
 2002       WRITE(21,1070) KTR
 2003       CONTINUE
 1070       FORMAT(///,9H FILE NO.,I5,/)
            PRINT 1080
 1080       FORMAT(5H TIME,5X,10HPEAK FREQ.,5X,10HAVG. FREQ.,5X,20HENERGY/ IN F
           1REQ. BAND,7X,19HSINGLE FREQ. ENERGY,4X,19HEFFECTIVE AMPLITUDE,4X,1
           27HNORMALIZED ENERGY,/,5H (MS),4X,29HEVENT INTERVAL EVENT INTERVAL,
           34X,5HEVENT,5X,8HINTERVAL,8X,5HEVENT,5X,8HINTERVAL,5X,5HEVENT,4X,5H
           4RATIO,8X,8HINTERVAL,5X,5HRATIO)
            DO 1200 I=1,NTIMES
 1200       IT(I) = IT(I)*ISI
            I = 1
            PRINT 1090,IT(I),FPEAK(I),FAVER(I),FENER(I),F20(I),FAA(I)
            IF(ITAPE)2004,2005
 2004       WRITE(21,1090) IT(I),FPEAK(I),FAVER(I),FENER(I),F20(I),FAA(I)
```

―Continued

```
2005   CONTINUE
       PRINT 1100,FPEAKI(I),FAUERI(I),FENERI(I),F20I(I),FA(I),FWORK(I)
       IF(ITAPE)2006,2007
2006   WRITE(21,1100) FPEAKI(I),FAUERI(I),FENERI(I),F20I(I),FA(I),FWORK(I)
2007   CONTINUE
       DO 1110 I=2,NTM1
       PRINT 1090,IT(I),FPEAK(I),FAUER(I),FENER(I),F20(I),FAA(I),FW(I-1)
       IF(ITAPE)2008,2009
2008   WRITE(21,1090) IT(I),FPEAK(I),FAUER(I),FENER(I),F20(I),FAA(I),FW(I-1)
2009   CONTINUE
1110   PRINT 1100,FPEAKI(I),FAUERI(I),FENERI(I),F20I(I),FA(I),FWORK(I)
       IF(ITAPE)2010,2011
2010   WRITE(21,1100) FPEAKI(I),FAUERI(I),FENERI(I),F20I(I),FA(I),FWORK(I)
2011   CONTINUE
       I = NTIMES
       PRINT 1090,IT(I),FPEAK(I),FAUER(I),FENER(I),F20(I),FAA(I)
       IF(ITAPE)2012,2013
2012   WRITE(21,1090) IT(I),FPEAK(I),FAUER(I),FENER(I),F20(I),FAA(I)
2013   CONTINUE
1090   FORMAT(1X,I4,2X,F7.2,8X,F7.2,9X,E12.5,14X,E12.5,13X,F7.0,26X,E12.5)
1100   FORMAT(14X,F7.2,8X,F7.2,14X,E12.5,14X,E12.5,8X,E12.5,2X,E12.5)
       DO 1210 I=1,NTIMES
1210   IT(I) = IT(I)/ISI
 245   CONTINUE
       DUMMY(1) = KTR
       DO 90 I=1,NTIMES
  90   DUMMY(I+1) = IT(I)*ISI/1000.
       K = NTIMES + 2
       DO 100 I=1,NTIMES
 100   DUMMY(K) = FAA(I)
       K = K + 1
       DO 110 I=1,NTIMES
 110   DUMMY(K) = FWORK(I)
       K = K + 1
       DO 250 I=1,NTIMES
 250   DUMMY(K) = FPEAKI(I)
       K = K + 1
       DO 260 I=1,NTIMES
 260   DUMMY(K) = FENERI(I)
       K = K + 1
       DO 270 I=1,NTIMES
 270   DUMMY(K) = FAUERI(I)
       K = K + 1
       DO 280 I=1,NTIMES
 280   DUMMY(K) = F20I(I)
       K = K + 1
       DO 300 I=1,NTIMES
 300   DUMMY(K) = FPEAK(I)
       K = K + 1
       DO 310 I=1,NTIMES
 310   DUMMY(K) = FENER(I)
       K = K + 1
       DO 320 I = 1,NTIMES
 320   DUMMY(K) = FAUER(I)
       K = K + 1
       DO 330 I =1,NTIMES
 330   DUMMY(K) = F20(I)
       K = K + 1
       DO 340 I=1,NTM1
 340   DUMMY(K) = FA(I)
       K = K + 1
       K = K - 1
       K = K * 2
       BUFFER OUT(20,1)(NUMMY,NUMMY(K))
 121   GO TO(121,123,122,122),UNITSTF(20)
 122   CALL OUTPRT(20,NUMMY,K,IEPR)
 123   CONTINUE
       RETURN
       END
```

PROGRAM DESCRIPTION - ESPLOT Form No. 1

I. IDENTIFICATION

A. Program Name — ESPLOT
B. Program Number — 3212.00
C. Programmer — Roy Quay
D. Date — 16 Jan 73
E. Documented by — Roy Quay
F. Compiler Language — FORTRAN II. INTRODUCTION AND PURPOSE: Plots output of CXPICK1 Program. ESP* SYSTEM section plots. Options are:

1. Computer Verification of Horizons Picked for Analysis (Horizon Picks)
2. Effective Amplitude of the Signal at the Picked Horizons (Effective Horizon Amplitude)
3. Normalized Energy From Total Interval Between Picked Horizons (Interval Energy)
4. Peak Frequency Between Picked Horizons (Interval Peak Frequency)
5. Band-Limited Normalized Energy Between Picked Horizons (Interval Band-Limited Energy)
6. Energy Weighted Average Frequency Between Picked Horizons (Interval Energy Weighted Average Frequency)
7. Normalized Energy at a Discrete Frequency Between Picked Horizons (Interval Energy at **HZ)
8. Peak Frequency of Wavelet at the Picked Horizons (Horizon Peak Frequency)
9. Band-Limited Energy of Wavelet at the Picked Horizons (Horizon Energy)
10. Energy Weighted Average Frequency of Wavelet at the Picked Horizons (Horizon Energy Weighted Average Frequency)
11. Energy at a Discrete Frequency of Wavelet at the Picked Horizons (Horizon Energy at **HZ)
12. Percentage of Energy at a Discrete Frequency Between Picked Horizons (Interval % Energy at **HZ)
13. Percentage of Energy at a Discrete Frequency at the Picked Horizons (Horizon % Energy at **HZ)

** Variable
* MARK, PETTY GEOPHYSICAL ENGINEERING CO.

3200 MSOS CONTROL CARDS ESPLOT Form No. 2

Entries begin in column one, unless specified otherwise, and there should be no blanks before the free field.

| Card 1 | 7/9 SEQUENCE, 123, free field |
|---|---|
| Card 2 | 7/9 JOB, work order No., user's name |
| Card 3 | 7/9 EQUIP, 10=MT, 25=MT |
| Card 4 | 7/9 ACCTSTRT, P=ESPLOT, R=YYY |
| | yyy=Number of plots to process |

| Card 5 | Column No. | Description |
|---|---|---|
| | 1–5 | 01120 |
| | 6–10 | 00025 |
| | 11–15 | 60212 |
| | 16–20 | 00002 |
| | 21–25 | 56031 |
| | 26–30 | 20000 |
| | 31–33 | 256 |
| Card 6 | ACCTSTRT, C=xxx–x | |
| | (column 2–17) | |
| | xxx–x=Run code with group number | |
| Card 7 | 7/9 ESPLOT | |
| | Data Cards | |
| Card 8 | FINIS | |
| | (column 10–14) | |
| Card 9 | 7/9 ACCTEND | |
| Card 10 | 7/8 7/8 EOF | |

DATA CARD FORMAT ESPLOT Form No. 3

PROGRAM:
FORMAT: All format is I5 unless otherwise specified

| CARD NO. | COL. NO. | PARAM | FMT | DESCRIPTION |
|---|---|---|---|---|
| 1 | 1–5 | MOPT | I5 | Type of Plot |
| | | | | 1 Computer Verification of Horizons Picked for Analysis (Horizon Picks) |
| | | | | 2 Effective Amplitude of the Signal at the Picked Horizons (Effective Horizon Amplitude) |
| | | | | 3 Normalized Energy From Total Interval Between Picked Horizons (Interval Energy) |
| | | | | 4 Peak Frequency Between Picked Horizons (Interval Peak Frequency) |
| | | | | 5 Band-Limited Normalized Energy Between Picked Horizons(Interval Band-Limited Energy) |
| | | | | 6 Energy Weighted Average Frequency Between Picked Horizons (Interval Energy Weighted Average Frequency) |
| | | | | 7 Normalized Energy at a Discrete Frequency Between Picked Horizons (Interval Energy at ** HZ) |
| | | | | 8 Peak Frequency of Wavelet at the Picked Horizons (Horizon Peak Frequency) |
| | | | | 9 Band-Limited Energy of Wavelet at the Picked Horizons (Horizon Energy) |
| | | | | 10 Energy Weighted Average Frequency of Wavelet at the Picked Horizons (Horizon Energy Weighted Average Frequency) |
| | | | | 11 Energy at a Discrete Frequency of Wavelet at the Picked Horizons (Horizon Energy at ** HZ) |
| | | | | 12 Percentage of Energy at a Discrete Frequency Between Picked Horizons (Interval % Energy at **HZ) |
| | | | | 13 Percentage of Energy at a Discrete Frequency at the Picked Horizons (Horizon % Energy at **HZ) |
| | | | | ** Variable |
| | 6–20 | XXINC | F15.10 | X Plot increment between traces in inches (to 8 decimal places or more) |
| | | | | − Right to left |
| | | | | + Left to right |
| | 21–35 | YYINC | F15.10 | Y Plot increment (in./sec.) |
| | | | | (note: X and Y are determined accurately from seismic sectins) |
| | 37–40 | LLINET | A4 | 0 Timing boundaries off (interval plot) |
| | | | | YEAP Timing boundaries on (interval plot) |
| | 41–45 | NRCPS | I5 | Frequency range (CPS) for options 4,6,8,and 10 |
| | | | | 0 or blank 20 CPS |
| | 46–50 | HAVG | F5.0 | Height of the lateral average frequency above the base line on a 5 in./sec. plot |
| | | | | 0 or blank 0.2 inches |
| | | | | (applies only to types 4,6,8,10) |

DATA CARD FORMAT ESPLOT Form No. 3

PROGRAM:
FORMAT: All format is I5 unless otherwise specified

| CARD NO. | COL. NO. | PARAM | FMT | DESCRIPTION |
|---|---|---|---|---|
| 2 | 1–5 | MOPT | I5 | Type of Plot |
| | | | | 1 Computer Verification of Horizons Picked for Analysis (Horizon Picks) |
| Use as many Card 2's as needed | | | | 2 Effective Amplitude of the Signal at the Picked Horizons (Effective Horizon Amplitude) |

PROGRAM:
FORMAT: All format is I5 unless otherwise specified
CARD NO.  COL. NO.  PARAM  FMT  DESCRIPTION

| | | | | |
|---|---|---|---|---|
| | | 3 | | Normalized Energy From Total Interval Between Picked Horizons (Interval Energy) |
| | | 4 | | Peak Frequency Between Picked Horizons (Interval Peak Frequency) |
| | | 5 | | Band-Limited Normalized Energy Between Picked Horizons (Interval Band-Limited Energy) |
| | | 6 | | Energy Weighted Average Frequency Between Picked Horizons (Interval Energy Weighted Average Frequency) |
| | | 7 | | Normalized Energy at a Discrete Frequency Between Picked Horizons (Interval Energy at ** HZ) |
| | | 8 | | Peak Frequency of Wavelet at the Picked Horizons (Horizon Peak Frequency) |
| | | 9 | | Band-Limited Energy of Wavelet at the Picked Horizons (Horizon Energy) |
| | | 10 | | Energy Weighted Average Frequency of Wavelet at the Picked Horizons (Horizon Energy Weighted Average Frequency) |
| | | 11 | | Energy at a Discrete Frequency of Wavelet at the Picked Horizons (Horizon Energy at ** HZ) |
| | | 12 | | Percentage of Energy at a Discrete Frequency Between Picked Horizons (Interval % Energy at ** HZ) |
| | | 13 | | Percentage of Energy at a Discrete Frequency at the Picked Horizons (Horizon % Energy at **HZ) ** Variable |

NOTE:
All other entries if blank are held same as previous card by the program except col. 37–40 which must contain YFAP if time boundaries are to be plotted. (on Interval plots)
Blank Card   Terminates Job

PROGRAMMING INFORMATION — ESPLOT Form No. 4

I. DETAILED PROGRAM DESCRIPTION

A. Input
7 track CXPICK1 tape

B. Output
CalComp plot tape

C. Programming Methods — verbal flow chart Include all subprograms (i.e. subroutines that are used solely by the particular program). Indicate any I/O that occurs within the subprogram.

```
      PROGRAM ESPLOT
      COMMON HDATA(300),MPR(64, 50),NRG(64, 50),HATENS(64, 50),NUGFDS
     1(3, 50)
      COMMON SCAL(3,50),PBUF(1500),XINC,LADD,YINC,MOPT,LINET
      CALL DSKSET(3,1,2,3)
      REWIND 25
      JBLANK=4H
      JYEA=4HYEAP
      CALL PLOTS(PBUF,3500,25)
      NTRIP=0
   39 CONTINUE
      NTRIP=NTRIP+1
C-----NRCPS IS RANGE OF FREQ ABOUT LATERAL AV FREQ(NOMINAL VALUE 20 HZ)
C-----HAVG IS DESIRED HGT OF LAT AV FREQ(ON 5 IN/SEC PLOT NOM.VALUE 0.2 INCH)
      READ  1,MOPT,XXINC,YYINC,LLINET,NRCPS,HAVG
      PRINT 1,MOPT,XXINC,YYINC,LLINET,NRCPS,HAVG
    1 FORMAT(I5,2F15.10,1X,A4,I5,F5.0)
      IF(MOPT.GT.13)MOPT=0
      IF(NTRIP.GT.1)GO TO 2
      IF(XXINC.EQ.0.0.OR.YINC.EQ.0.0)PRINT 90
   90 FORMAT(/// 10X,20HNO SCALE GIVEN ABORT    ///)
      IF(XXINC.EQ.0.0.OR.YINC.EQ.0.0)CALL ABNORMAL
      LINET=0
      IF(LLINET.EQ.JYEA)LINET=1
      YINC=YYINC
      XINC=XXINC
      IF(NRCPS.LE.0)NRCPS=20
      RANGE=NRCPS/2.0
      IF(HAVG.LE.0.0)HAVG=0.2
      CHAVG=HAVG
    2 CONTINUE
      IF(MOPT.GT.1)LINET=0
      IF(NRCPS.EQ.0)GO TO 102
      IF(NRCPS.LE.0)NRCPS=20
      RANGE=NRCPS/2.0
  102 CONTINUE
      IF(HAVG.LE.0.0)GO TO 104
      IF(HAVG.LE.0.0)HAVG=0.2
      CHAVG=HAVG
  104 CONTINUE
      IF(LLINET.EQ.JBLANK)GO TO 100
      IF(LLINET.EQ.JYEA)LINET=1
  100 CONTINUE
      IF(XXINC.EQ.0.0)GO TO 110
      XINC=XXINC
  110 CONTINUE
      IF(YYINC.EQ.0.0)GO TO 120
      YINC=YYINC
```

```
     120 CONTINUE
         IF(MOPT.LE.0)GO TO 49
         IF(MOPT.EQ.1)LINET=1
         IF(LINET.NE.1)LINET=0
         CALL INITIAL
         PRINT 130,MOPT,XINC,YINC,LINET,NRCPS,CHAUG,RANGE
     130 FORMAT(1X,I5,2F15.10,2I5,F5.3,F5.1)
         LTRAC = NPOINT = NEOF = 0
         REWIND 10
C        MYT=0
         NGO=800
         CALL HOWLONG(NDATA,NGO,LOS,ITRACN)
   3     NPAR = 0
C        IF(MYT.EQ.28-1)NGO=2
   4     BUFFERIN(10,1)(NDATA(1),NDATA(NGO))
   5     GO TO (5,10,30,6)UNITSTF(10)
   6     NPAR = NPAR + 1
         IF(NPAR.GT.5)GO TO 7
         BACKSPACE 10
         GO TO 4
   7     PRINT 8,NDATA(1)
   8     FORMAT(1X,20HPARITY ERROR TRACE  ,I6)
  10     NOS=LENGTHF(10)
         IF(NOS.LT.LOS)CALL SHORT(NDATA,NOS)
C        MYT=MYT+1
C        IF(MYT.EQ.28)GO TO 15
         NOTIME=LOS/24
C  15    NGO=800
         LTRAC = LTRAC + 1
         IF(LTRAC.LT.17) GO TO 20
         NPOINT = NPOINT + 1
         LTRAC = 1
  20     CONTINUE
C XXXXXX SET UP AVERAGE TIMES FOR PLOTS
         NPLOTS = 3*NOTIME-3
         JDO=NOTIME-1
         IF(MOPT.EQ.2.OR.MOPT.GT.7) JDO = NOTIME
         IF(MOPT.EQ.12) JDO = NOTIME - 1
         IF(MOPT.LT.4) CALL STP3E(JDO,NOTIME,LTRAC,NPAR)
         IF(MOPT.EQ.4)CALL STP4E(JDO,NOTIME,LTRAC,NPAR)
         IF(MOPT.EQ.5)CALL STP3E(JDO,NOTIME,LTRAC,NPAR)
         IF(MOPT.EQ.6)CALL STP4E(JDO,NOTIME,LTRAC,NPAR)
         IF(MOPT.EQ.7)CALL STP3E(JDO,NOTIME,LTRAC,NPAR)
         IF(MOPT.EQ.8.OR.MOPT.EQ.10) CALL STP4E(JDO,NOTIME,LTRAC,NPAR)
         IF(MOPT.EQ.9.OR.MOPT.EQ.11) CALL STP3E(JDO,NOTIME,LTRAC,NPAR)
         IF(MOPT.EQ.12.OR.MOPT.EQ.13)CALL STP4E(JDO,NOTIME,LTRAC,NPAR)
         IF(LTRAC.LT.16)GO TO 3
         GO TO 32
  30     NEOF = 1
         REWIND 10
         IF(LTRAC.EQ.16)GO TO 40
  32     CONTINUE
C XXXXXXX SHIP TO DISC
         DO 35 J=1,JDO
         CALL WTSTAT(1)
         KSTART=(J-1)*192+NPOINT+1
C        GO TO 34
         CALL LOCDSK(KSTART,1)
C        IF(J.EQ.1)GO TO 33
         NWORDS(1,J) = NWORDS(1,J) + 4*LTRAC
         CALL WRTDSK(1,NATENG(1,J),64)
         CALL WTSTAT(1)
  33     CALL WTSTAT(2)
         CALL LOCDSK(KSTART,2)
         NWORDS(2,J) = NWORDS(2,J)+4*LTRAC
         CALL WRTDSK(2,NRG(1,J),64)
         CALL WTSTAT(2)
C        GO TO 35
  34     CONTINUE
         CALL WTSTAT(3)
         CALL LOCDSK(KSTART,3)
         NWORDS(3,J) = NWORDS(3,J)+4*LTRAC
         CALL WRTDSK(3,MPR(1,J),64)
         CALL WTSTAT(3)
  35     CONTINUE
  40     CONTINUE
         IF(NEOF.EQ.0)GOTO 3
         CALL PLOTTE(JDO,ITRACN,RANGE,CHAUG)
         GO TO 99
  49     CONTINUE
         CALL PLOT(0.0,0.0,-3)
         CALL PLOT(0.0,0.0,999)
         REWIND 25
         CALL RE800BPI(25)
         PRINT 50
         WRITE(59,50)
  50     FORMAT (5X,17HESPLOT   COMPLETED          )
         END

SUBROUTINE PLOTTE(JDO,ITRACN,RANGE,CHAUG)
         COMMON
   1       NDATA(2),DATA(5199),NWORDS(3, 50),SCAL(3, 50),FBUF(3500)
         COMMON XINC,LADD,YINC,MOPT,LINET
         FH = 0.1 * YINC/2.5
         FLH = 3.0 * FH
         NBOUND = 0
         ALE=1.0
         IF(MOPT.EQ.2)ALE=10.**3
         IF(MOPT.EQ.3)ALE=10.**5
         IF(MOPT.EQ.5)ALE=10.**11
         IF(MOPT.EQ.7)ALE=10.**9
         IF(MOPT.EQ.9)ALE=10.**11
         IF(MOPT.EQ.11)ALE=10.**9
         IF(MOPT.EQ.2.OR.MOPT.GT.7) NBOUND = 1.0
         IF(MOPT.EQ.12) NBOUND = 0
```

```
              CALL PLOT (0.0,0.0,-3)
              FOPT=MOPT
              CALL NUMBER(-4.0,0.0,FLH,FOPT,0.0,0)
              ZINC = 1.00196
              ZINC=1.0007
       C      LARGER SCALE FACTOR FOR RED PAPER
              Y = 28.0*ZINC
              X = -NWORDS(1,1)/4*XINC
              IF(XINC.GT.0.0)X=0.0
              CALL PLOT(X,Y,-3)
              X=0.0
              YINC=-YINC*ZINC
              NRUN=3
              NSONE=1
              IF(MOPT.EQ.1)NSONE=3
              IF(LINET.EQ.0)NRUN=2
              DO 500 MM=NSONE,NRUN
              SMIN=0.0
              ELIM=-YINC/5.0
              IF(MM.EQ.3.AND.NBOUND.EQ.1) JDO = JDO - 1
              DO 100 J=1,JDO
              LDO = NWORDS(MM,J)
              CALL WTSTAT(MM)
              KSTART=(J-1)*192+1
              CALL LOCDSK(KSTART,MM)
              CALL WTSTAT(MM)
              CALL READSK(MM,NDATA(3),LDO)
              LDO=LDO/2
              MDO=LDO/2
       C      AVE AT 0.125 INCHES FOR 5 IN/SEC PLOT
              SCALE=-.00625 *NWORDS(MM,J)/SCAL(MM,J)*YINC
              AVG=SCAL(MM,J)/MDO
       C      WANT TO MODIFY SCAL ON OPT 4,6,8,10 OF 11 OPTIONS
              IF(MOPT/2*2.NE.MOPT.OR.MOPT.EQ.2)GO TO 8
       C      DAMMIT NOW HAVE 13 OPTIONS
              IF(MOPT.GT.10)GO TO 8
              SCALE=SCALE*2.0
       C      AVE FREQ TO BE 0.2 IN AT 5 IN/SEC    NOMINAL
       C      AVE FREQ TO BE CHAVG IN FOR 5 IN/SEC PLOT
              IF(MM.NE.1)GO TO 8
       C      10 HZ CHANGE TO BE 0.2 IN ON 5 IN/SEC PLOT    NOMINAL
       C      RANGE HZ CHANGE TO BE CHAVG IN AT 5 IN/SEC PLOT
       C  SET AVE - 10 HZ TO BE SUBTRACTED
              SMIN=AVG-RANGE
       C      SET SCALE AVERAGE VALUE WILL BE 10 HZ AFTER SUBTRACTION OF SMIN
              SCALE=-CHAVG*0.2*YINC/RANGE
              ELIM = 2.5 * SCALE * RANGE
            8 CONTINUE
              IF(MM.EQ.3)SMIN=0.0
              IF(MM.EQ.2)SCALE = -SCALE
              IF(MM.EQ.3)SCALE=YINC
              CALL WTSTAT(MM)
              Y = DATA(1)*YINC
              IF(MM.EQ.3.AND.J.EQ.1)Y=DATA(2)*YINC
              CALL PLOT(X,Y,3)
              T=DATA(1)
              X=0.0
              IF(J.GT.1)GO TO 2008
              IF(MM.EQ.1)PRINT 2000
         2000 FORMAT(/// 7X,5HEVENT,1X,9HBEG. TIME,13X,14HLAT.AVG. VALUE,10X,10H
             1NO. TRACES /)
              IF(MM.EQ.2)PRINT 2005
         2005 FORMAT(/// 7X,5HEVENT,1X,9HBEG. TIME,19X,14HLAT.AVG. RATIO,10X,10H
             1NO. TRACE /)
              IF(MM.EQ.3)PRINT 2006
         2006 FORMAT(/// 7X,5HEVENT,1X,9HBEG. TIME,43X,10HNO. TRACES /)
         2008 CONTINUE
              NMTC = NWORDS(1,1) / 4
              IF(MM.LT.3)PRINT 2010,MM,J,T,AVG,NMTC
         2010 FORMAT(5X,I2,3X,I2,4X,F6.3,13X,E20.4,10X,I5)
              IF(MM.EQ.3) PRINT 2011,MM,J,T,NMTC
         2011 FORMAT(5X,I2,3X,I2,4X,F6.3,43X,I5)
              CALL PLOT(X,Y,3)
              IF(MM.GT.1) GO TO 10
              FOUT = 3.0 * FLH+0.2
              IF(XINC.GT.0.0) FOUT = -1.0 * (3.* FLH + 5.* FH)
              CALE = (SCAL(MM,J) / (NWORDS(MM,J) /4.)) / ALE
              GO TO(991,980,980,991,980,991,980,991,980,991,980,991,991) MOPT
          980 IF(J.GT.1) GO TO 988
              ZALE = CALE
          988 CALE = CALE / ZALE
          991 CONTINUE
              IF(MOPT.EQ.1) GO TO 10
              CALL NUMBER(X+FOUT,Y,0.1,CALE,0.0,4)
              CALL PLOT(X,Y,3)
           10 CONTINUE
              L=0
              DO 50 K=2,LDO,2
              X=L*XINC
              L=L+1
              IF(MM.EQ.3.AND.J.GT.1)GO TO 50
       C      YY=DATA(K)*SCALE
              YY=(DATA(K)-SMIN)*SCALE
       C      TRUNCATE FREQ DISPLAY AT 10 HZ BELOW MEAN FREQ OF EVENT
              IF(MM.EQ.1.AND.YY.LT.0.0)YY=0.0
              IF(MM.NE.3)GO TO 30
              Y=YY
              GO TO 40
           30 CONTINUE
       C      TRUNCATE TOP VALUES OF PLOT
              IF(YY.GT.ELIM)YY=ELIM
              IF(YY.LT.-ELIM)YY=-ELIM
              Y=YY+DATA(K-1)*YINC
           40 CONTINUE
              CALL PLOT(X,Y,2)
           50 CONTINUE
              Y = DATA(K-3)*YINC
              IF(MM.EQ.3)CALL PLOT(X,Y,3)
              CALL PLOT(X,Y,2)
       C XXXXXXX PLOT AVERAGE TIME BACKWARDS
              KK = LDO + 1
              L = L - 1
              DO 70 K=1,LDO,2
```

```
         KK = KK-2
         X=L*XINC
         L=L-1
         Y=DATA(KK)*YINC
   70    CALL PLOT(X,Y,2)
  100    CONTINUE
C XXXXXXX CHANGE ORIGIN
  500    CONTINUE
         CALL LABTE(XINC,YINC,MD0,Y,PBUF(1 ),ITRACN,CHAUG,RANGE,MOPT)
         YINC=-YINC ZINC
         END

SUBROUTINE HOWLONG(IA,NGO,LOS,ITRACN)
         DIMENSION IA(2)
C     READ AT BEG UNTILL NO PARITY ERROR
         DO 20 J=1,10
         BUFFERIN(10,1)(IA(1),IA(NG0))
   15    GO TO(15,25,16,16)UNITSTF(10)
   16    PRINT 17
   17    FORMAT(1X,13 HPARITY AT BEG2X,16HSKIPPED A TRACE //)
   20    CONTINUE
   25    BACKSPACE 10
         MAX=0
         L=0
         DO 50 J=1,10
         L=L+1
         BUFFERIN(10,1)(IA(1),IA(NG0))
    5    GO TO(5,10,55,10)UNITSTF(10)
   10    LOS=LENGTHF(10)
         IF(L.EQ.1) CALL TRN0(IA,ITRACN)
         IF(LOS.GT.MAX)MAX=LOS
   50    CONTINUE
   55    LOS=MAX
         PRINT 60,LOS
   60    FORMAT(/// 5X,8HLENGTH   ,I6,1X,8HSAMPLES   ///)
         DO 70 J=1,L
   70    BACKSPACE 10
         END

SUBROUTINE INITIAL
         COMMON NDATA(300),NDUM( 9600),NWORDS(150),SCAL(150)
         DO 2 J=1,150
         SCAL(J)=999.
         SCAL(J)=0.0
    2    NWORDS(J)=0
         RETURN
         END

SUBROUTINE STP3E(JD0,NOTIME,LTRAC,NPAR)
         COMMON DATA(400),AMPR(32, 50),ENRG(32, 50),RATENG(32, 50),NWORDS
        1(3, 50),SCAL(3, 50)
         COMMON PBUF(3500),XINC,LADD,YINC,MOPT
C     REPEAT PREV TRACE IF PARITY ERROR
         IF(NPAR.LT.6)GO TO 10
         LPTRAC=LTRAC-1
         IF(LPTRAC.EQ.0)LPTRAC=16
         DO 5 J=1,JD0
         RATENG(2*LTRAC-1,J)=RATENG(2*LPTRAC-1,J)
         RATENG(2*LTRAC,J)=RATENG(2*LPTRAC,J)
         ENRG(2*LTRAC-1,J)=ENRG(2*LPTRAC-1,J)
         ENRG(2*LTRAC,J)=ENRG(LPTRAC,J)
         AMPR(2*LTRAC-1,J)=AMPR(2*LPTRAC-1,J)
         AMPR(2*LTRAC,J)=AMPR(2*LPTRAC,J)
         SCAL(1,J)=SCAL(1,J)+RATENG(2*LTRAC,J)
         SCAL(2,J)=SCAL(2,J)+ENRG(2*LTRAC,J)
    5    SCAL(3,J)=SCAL(3,J)+AMPR(2*LTRAC,J)
         RETURN
   10    CONTINUE
         LADD = MOPT - 1
         IF(LADD.EQ.0)LADD=1
         AVENG = 250.
         IF(MOPT.EQ.2)AVENG=25.0
         DO 25 J=1,JD0
         AUT=(DATA(J+1)+DATA(J+2))/2.0
         IF(MOPT.EQ.2.OR.MOPT.GT.7) AUT = DATA(J+1)
         RATENG(2*LTRAC-1 ,J)=AUT
         K=LADD*NOTIME+J+1
         RATENG(2*LTRAC,J)=DATA(K)
         SCAL(1,J)=SCAL(1,J)+RATENG(2*LTRAC,J)
         ENRG(2*LTRAC-1,J)=AUT
         FUN=DATA(K+1)
         IF(FUN.LT.AVENG)FUN=AVENG
         FUN=DATA(K)/FUN
         ENRG(2*LTRAC,J)=FUN
         IF(J.EQ.JD0)ENRG(2*LTRAC,J)=0.0
         SCAL(2,J)=SCAL(2,J)+ENRG(2*LTRAC,J)
         AMPR(2*LTRAC-1,J)=DATA(J+2)
   25    AMPR(2*LTRAC,J)=DATA(J+1)
         RETURN
         END
```

—Continued

```
      SUBROUTINE LABTE(XINC,YINC,MDO,Y,PB,ITRACN,CHAUG,RANGE,MOPT)
      DIMENSION PB(2)
      DIMENSION NLAB(5)
      DIMENSION NRLA(2),NSCB(2),NULA(2),NLIN(2)
      SAVEY=Y
      XEND = MDO*XINC
      FAKE = -1.0
      IF(XINC.LT.0.0)FAKE = 1.0
      FH = -0.1 * YINC/2.5
      FLH = 3.0 * FH
      X=0.0
      IF(XINC.GT.0.0)X=-20.*FH
      Y = 3.0 * FH
      NLAB(1) = 4HAMP
      NLAB(2) = 4HOF A
      NLAB(3) = 4HVE V
      NLAB(4) = 4HALUE
      NLAB(5) = 4H IS
      NLIN(1) = 4HINCH
      NLIN(2) = 4HES
      NRLA(1) = 4HRELA
      NRLA(2) = 4HTIVE
      NSCB(1) = 4HSCAL
      NSCB(2) = 4HE
      NULA(1) = 4HVALU
      NULA(2) = 4HES
      YSINC=YINC/1.0007
      FAMP=-0.125*YSINC*0.2
C     MODIFY SCALE OF OPIONS 4,6,8,10 OF 11 OPTIONS
      IF(MOPT/2*2.NE.MOPT.OR.MOPT.EQ.2)GO TO 2
      IF(MOPT.GT.10)GO TO 2
      FAMP=-CHAUG*0.2*YSINC
   2  CONTINUE
      CALL SYMBOL(X,Y,FH,NLAB(1),0.0,20)
      CALL NUMBER(X+21.0*FH,Y,FH,FAMP,0.0,4)
      CALL SYMBOL(X+26.*FH,Y,FH,NLIN(1),0.0,8)
      GO TO(101,100,100,101,100,101,100,101,100,101,100,101,101) MOPT
 100  CONTINUE
      CALL SYMBOL(X+.80,Y-1.0,0.15,NRLA(1),0.0,8)
      CALL SYMBOL(X+1.0,Y-1.25,0.15,NSCB(1),0.0,8)
      CALL SYMBOL(X+0.95,Y-1.50,0.15,NULA(1),0.0,8)
      CALL PLOT(X+1.70,Y-1.38,3)
      CALL SYMBOL(X+1.3,Y-1.9,0.25,6,180.0,-6)
 101  CONTINUE
      Y=SAVEY
      CALL PLOT(0.0,0.0,3)
      CALL PLOT(XEND,0.0,2)
      LTIME = (Y/YINC+0.5)*1000.0
      LINC = LTIME/500+1
   5  CK = 0.5*LINC*YINC
      IF(CK.LT.-28.0)10,20
  10  LINC = LINC - 1
      GO TO 5
  20  NTRIP = 0
      XX = -0.2
      IF(FAKE.EQ.1)XX = 1.5
  25  DO 40 J=1,LINC
      F = 0.5*J
      Y = F*YINC
      X = XEND
      CALL PLOT(X,Y,3)
      CALL PLOT(X-0.2*FAKE,Y,2)
      CALL NUMBER(X-XX,Y,FLH,F,0.0,1)
  40  CONTINUE
      XX=1.6
      IF(FAKE.EQ.1.0)XX = -0.2
      XEND = 0.0
      IF(FAKE.EQ.1.0)XEND = 0.2
      NTRIP = NTRIP + 1
      IF(FAKE.EQ.-1.0)FAKE=1.0
      IF(NTRIP.EQ.1)GO TO 25
      CALL PLOT(0.0,0.0,3)
      J = ITRACN - 1
      DO 50 K=1,MDO
      X=(K-1)*XINC
      J = J + 1
      Y=0.0
      CALL PLOT(X,Y,3)
      YY=0.1
      IF(J/24*24.EQ.J)YY=0.2
      CALL PLOT(X,YY,2)
  50  CONTINUE
      XEND=14.0
      IF(XINC.GT.0.0)XEND=XEND+MDO*XINC
      CALL PLOT(XEND,-28.0,-3)
      END

SUBROUTINE SHORT(AI,NOS)
      DIMENSION AI(2)
      PRINT 10,NOS,AI(1)
  10  FORMAT(///,5X,6HSHORT ,I6,1X,6HTRACE ,F7.0  //)
      END

SUBROUTINE TRNO(AI,ITRACN)
      DIMENSION AI(2)
      ITRACN = AI(1)
      END
```

```
      SUBROUTINE STP4E(JD0,N0TIME,LTRAC,NPAR)
      COMMON DATA(400),AMPR(32, 50),ENRG(32, 50),RATENG(32, 50),NWORDS
     1(3, 50),SCAL(3, 50)
      COMMON PBUF(3500),XINC,LADD,YINC,MOPT
      IF(NPAR.LT.6)GO TO 10
      LPTRAC=LTRAC-1
      IF(LPTRAC.EQ.0)LPTRAC=16
      DO 5 J=1,JD0
      RATENG(2*LTRAC-1,J)=RATENG(2*LPTRAC-1,J)
      RATENG(2*LTRAC,J)=RATENG(2*LPTRAC,J)
      ENRG(2*LTRAC,J)=ENRG(LPTRAC,J)
      ENRG(2*LTRAC,J)=ENRG(LPTRAC,J)
      AMPR(2*LTRAC-1,J)=AMPR(2*LPTRAC-1,J)
      AMPR(2*LTRAC,J)=AMPR(2*LPTRAC,J)
      SCAL(1,J)=SCAL(1,J)+RATENG(2*LTRAC,J)
      SCAL(2,J)=SCAL(2,J)+ENRG(2*LTRAC,J)
    5 SCAL(3,J)=SCAL(3,J)+AMPR(2*LTRAC,J)
      RETURN
   10 CONTINUE
      LADD = MOPT - 1
      IF(MOPT.EQ.12)LADD=LADD-5
      IF(MOPT.EQ.13)LADD=LADD-2
      DO 25 J=1,JD0
      AUT=(DATA(J+1)+DATA(J+2))/2.0
      IF(MOPT.EQ.12)GO TO 12
      IF(MOPT.EQ.2.OR.MOPT.GT.7) AUT = DATA(J+1)
   12 CONTINUE
      RATENG(2*LTRAC-1 ,J)=AUT
      K=LADD*N0TIME+J+1
      RATENG(2*LTRAC,J)=DATA(K)
      L=(LADD-2)*N0TIME+J+1
      IF(MOPT.EQ.12.OR.MOPT.EQ.13)RATENG(2*LTRAC,J)=DATA(K)/DATA(L)*100.
      SCAL(1,J)=SCAL(1,J)+RATENG(2*LTRAC,J)
      ENRG(2*LTRAC-1,J)=AUT
      IF(MOPT.NE.12.AND.MOPT.NE.13)GO TO 15
      FUN=DATA(K+1)/DATA(L+1)*100.
      MAY NEED TO LIMIT DIVISOR
      IF(FUN.LT.0.8)FUN=0.8
      FUN=RATENG(2*LTRAC,J)/FUN
      GO TO 20
   15 CONTINUE
      FUN=DATA(K+1)
      IF(FUN.LT.1.0)FUN=1.0
      FUN=DATA(K)/FUN
   20 CONTINUE
      ENRG(2*LTRAC,J)=FUN
      IF(J.EQ.JD0)ENRG(2*LTRAC,J)=0.0
      SCAL(2,J)=SCAL(2,J)+ENRG(2*LTRAC,J)
      AMPR(2*LTRAC-1,J)=DATA(J+2)
   25 AMPR(2*LTRAC,J)=DATA(J+1)
      RETURN
      END
```

BIBLIOGRAPHY

Balch, A. H., GEOPHYSICS, Vol. 36, No. 6 (December, 1971) p. 1075, "Color Sonograms: A New Dimension in Seismic Data Interpretation."

Craft, Cecil, THE OIL AND GAS JOURNAL, Feb. 19, 1973, pp. 122–125, "Detecting Hydrocarbons—For Years."

Grossling, Bernardo F., Canadian Pat. No. 646,179, issued Aug. 7, 1962, "Method of Seismic Prospecting."

Mateker, Emil J., U.S. Pat. No. 3,671,930, issued June 20, 1972, "Method of Seismographic Exploration by Measuring the Attenuation Coefficient in Geologic Section."

Parrack et al., U.S. Pat. No. 3,246,720.

Pennebaker, Jr., E. F., Canadian Pat. No. 905,518, issued July 18, 1972, "Method for Prediction of Abnormal Pressures from Routine or Special Seismic Records."

Quay, Roy G., U.S. Pat. No. 3,668,618, issued June 6, 1972, "Identification and Classification of Seismic Reflection Velocity Properties on Seismic Reflection Sections."

Savit, Carl H., U.S. Pat. No. 3,662,325, issued May 9, 1972, "Method of Displaying Seismic Data."

Savit, Carl H., U.S. Pat. No. 3,706,069.

Sheng Wu, Chang, U.S. Pat. No. 3,622,965, "Method of Geophysical Prospecting by Measuring the Attenuation of Seismic Waves in the Earth."

What is claimed to have been invented or discovered is:

1. A method of seismic surveying comprising the steps of:
    obtaining a plurality of seismic signals each from different points along a traverse in a seismic survey;
    generating a multi-channel seismic record of such seismic signals grouped in side-by-side format to represent a section of the geological structure of the earth beneath such traverse;
    selecting multiple sets of laterally extending guidelines associated at least in part with the geologic structure represented on such seismic record;
    extracting a seismic property from the data contained within zones associated with each of such guidelines;
    establishing a reference axis that conforms with such guidelines; and
    plotting a value proportional to the magnitude of such seismic property about such reference axis.

2. A method according to claim 1 wherein said seismic property is extracted from the zone located between a pair of adjacent guidelines and such reference axis is defined by the mean points between such pair of adjacent guidelines.

3. A method according to claim 1 wherein such seismic property is selected from within a zone centered upon one of such guidelines and is plotted about a reference axis lying upon such guideline.

4. A method according to claim 1 wherein the plotting step is performed on a facsimile of such seismic record and to the same scale whereby such seismic property can be visually correlated with the characteristics of such seismic record section.

5. A method according to claim 1 wherein such guidelines are continuous.

6. A method according to claim 1 wherein such guidelines are discontinuous.

7. A method according to claim 1 wherein the plotting step is performed on a transparent record sheet and is overlaid in superposition on a facsimile of such seismic record to the same scale, whereby such seismic property can be visually correlated with the characteristics of such seismic record.

8. A method according to claim 1 wherein the plotted value is the deviation of the seismic property from the mean value of such seismic property across such seismic record.

9. A method according to claim 1 wherein the magnitude of such seismic property extracted from a given zone is plotted on one side of the reference axis associated with that zone and including the additional step of:
  plotting on the other side of such reference axis a value proportional to the relationship between the seismic property extracted from such zone and the seismic property extracted from the adjacent zone.

10. A method according to claim 9 wherein the magnitude of the seismic property extracted from a given zone is plotted on the upper side of the reference axis associated with such zone and such value proportional to the relationship is plotted on the lower side of such reference axis.

11. A method according to claim 9 wherein such relationship is the absolute value of the difference in magnitude between such seismic properties.

12. A method according to claim 9 wherein such relationship is the ratio of the magnitudes of such seismic properties.

13. A method according to claim 1 wherein such seismic property is the band limited energy in the amplitude spectrum of the seismic waves occurring in such zones.

14. A method according to claim 1 wherein such seismic property is the normalized effective amplitude of the seismic waves in such zones.

15. A method according to claim 1 wherein such seismic property is the normalized energy of the seismic waves occurring in such zones.

16. A method according to claim 1 wherein such seismic property is the peak frequency in the amplitude spectrum of the seismic waves occurring in such zones.

17. A method according to claim 1 wherein such seismic property is the band limited normalized energy in the amplitude spectrum of the seismic waves occurring in such zones.

18. A method according to claim 1 wherein such seismic property is the energy weighted average frequency in the amplitude spectrum of the seismic waves occurring in such zones.

19. A method according to claim 1 wherein such seismic property is the normalized energy of a discrete frequency component in the amplitude spectrum of the seismic waves occurring in such zones.

20. A method according to claim 1 wherein such seismic property is the normalized energy in the amplitude spectrum of the seismic waves in such zones.

21. A method according to claim 1 wherein such seismic property is the ratio of energy in one band limited portion of the amplitude spectrum to the energy in another band limited portion of the amplitude spectrum of the seismic waves in such zones.

22. A method according to claim 1 wherein the seismic property is the interval velocity of the seismic waves occurring in such zones.

23. A method according to claim 1 wherein the seismic property is the root-mean-square velocity of the seismic waves occurring in such zones.

24. A method according to claim 1 wherein the seismic property is the average velocity of the seismic waves occurring in such zones.

25. A method of seismic surveying comprising the steps of:
  a. obtaining a multi-channel seismic record section representative of a section of the geologic structure of the earth;
  b. selecting multiple sets of guidelines laterally extending across such record section;
  c. extracting a seismic property from the data contained in zones associated with a first and second of such guidelines;
  d. plotting a value proportional to the magnitude of the seismic property extracted from the zone associated with the first guideline on a record sheet on one side of a reference axis that conforms with such guidelines;
  e. plotting a value proportional to the relationship between the values of the seismic property extracted from the zones associated respectively with such first and such second guidelines on such record surface on the opposite side of such reference axis, whereby such seismic combined display of variations in the seismic property may be used for interpreting the subsurface character of the earth.

26. A method according to claim 25 in which the zone associated with such first guideline is the interval between such first and second guidelines and the zone associated with such second guideline is the interval between such second guideline and a later such guideline and such reference axis is defined by the mean points between such first and second guidelines.

27. A method according to claim 25 wherein such seismic property is selected from within a zone centered upon each of such first and second guidelines and such reference axis coincides with the first of such guidelines.

28. A method according to claim 25 in which the sets of guidelines are associated with geologic structure as interpreted upon such seismic record section.

29. A method according to claim 25 in which such relationship between the values of the seismic property associated with such first and such second guidelines represents the ratio of such first and second values.

30. A method according to claim 25 in which such relationship between the values of the seismic property associated with such first and such second guidelines represents the absolute value of the difference of such values.

31. A method according to claim 25 wherein such seismic property is the band limited energy in the amplitude spectrum of the seismic waves occurring in such zones.

32. A method according to claim 25 wherein such seismic property is the normalized effective amplitude of the seismic waves in such zones.

33. A method according to claim 25 wherein such seismic property is the normalized energy of the seismic waves occurring in such zones.

34. A method according to claim 25 wherein such seismic property is the peak frequency in the amplitude spectrum of the seismic waves occurring in such zones.

35. A method according to claim 25 wherein such seismic property is the band limited normalized energy in the amplitude spectrum of the seismic waves occurring in such zones.

36. A method according to claim 25 wherein such seismic property is the energy weighted average frequency in the amplitude spectrum of the seismic waves occurring in such zones.

37. A method according to claim 25 wherein such seismic property is the normalized energy of a discrete frequency component in the amplitude spectrum of the seismic waves occurring in such zones.

38. A method according to claim 25 wherein such seismic property is the normalized energy in the amplitude spectrum of the seismic waves in such zones.

39. A method according to claim 25 wherein such seismic property is the ratio of energy in one band limited portion of the amplitude spectrum of the energy in another band limited portion of the amplitude spectrum of the seismic waves in such zones.

40. A method according to claim 25 wherein the seismic property is the interval velocity of the seismic waves occurring in such zones.

41. A method according to claim 25 wherein the seismic property is the root-mean-square velocity of the seismic waves occurring in such zones.

42. A method according to claim 25 wherein the seismic property is the average velocity of the seismic waves occurring in such zones.

43. A method of seismic surveying comprising the steps of:

a. obtaining a multi-channel seismic record section representative of a section of the geologic structure of the earth;

b. establishing multiple sets of laterally extending guidelines associated at least in part with the geologic structure represented on such record section;

c. extracting a seismic property from within zones associated with such guidelines;

d. establishing multiple reference axes that conform with such guidelines;

e. determining the arithmetic mean value of the seismic property extracted from each zone; and f. plotting the deviations of the seismic property from such mean value about the associated reference axis.

44. A method according to claim 43 wherein said seismic property is extracted from within the zone between a pair of such adjacent guidelines and such reference axis is defined by the mean points between such adjacent guidelines.

45. A method according to claim 43 wherein such seismic property is extracted from within a zone centered upon one of such guideline and is plotted about a reference axis lying upon such guideline.

46. A method according to claim 43 wherein the plotting steps are performed on a facsimile of such seismic record section and to the same scale whereby such seismic property can be visually correlated with the characteristics of such seismic record section.

47. A method according to claim 43 wherein the record surface is transparent and is overlaid in superposition on a facsimile of such seismic record section to the same scale, whereby such seismic property can be visually correlated with the characteristics of such record.

* * * * *

UNITED STATES PATENT OFFICE
CERTIFICATE OF CORRECTION

PATENT NO. : 3,899,768
DATED : August 12, 1975
INVENTOR(S) : Roy Gibson Quay, Clifford Harvey Ray It is certified that error appears in the above-identified patent and that said Letters Patent are hereby corrected as shown below:

In Column 41, Line 19, after the word spectrum, delete "of" and add --to-- so that the corrected line reads --ited portion of the amplitude spectrum to the energy in--.

Signed and Sealed this ninth Day of December 1975

[SEAL]

Attest:

RUTH C. MASON
Attesting Officer

C. MARSHALL DANN
Commissioner of Patents and Trademarks